(12) United States Patent
Seimasa

(10) Patent No.: US 12,524,710 B2
(45) Date of Patent: Jan. 13, 2026

(54) INFORMATION PROCESSING DEVICE, INFORMATION PROCESSING METHOD, AND NON-TRANSITORY COMPUTER-READABLE MEDIUM

(71) Applicant: FRONTEO, Inc., Tokyo (JP)

(72) Inventor: Takafumi Seimasa, Tokyo (JP)

(73) Assignee: FRONTEO, Inc., Tokyo (JP)

( * ) Notice: Subject to any disclaimer, the term of this patent is extended or adjusted under 35 U.S.C. 154(b) by 1231 days.

(21) Appl. No.: 17/350,894

(22) Filed: Jun. 17, 2021

(65) Prior Publication Data

US 2021/0383281 A1 Dec. 9, 2021

(30) Foreign Application Priority Data

Jun. 8, 2020 (JP) .................. 2020-099521

(51) Int. Cl.
*G06N 20/20* (2019.01)
*G06N 5/01* (2023.01)
*G06N 5/04* (2023.01)

(52) U.S. Cl.
CPC .............. *G06N 20/20* (2019.01); *G06N 5/01* (2023.01); *G06N 5/04* (2013.01)

(58) Field of Classification Search
CPC ............ G06N 20/20; G06N 5/01; G06N 5/04; G06N 3/048; G06N 3/08; G06N 3/045
See application file for complete search history.

(56) References Cited

U.S. PATENT DOCUMENTS

| | | | |
|---|---|---|---|
| 9,942,264 B1* | 4/2018 | Kennedy | H04L 63/145 |
| 2003/0088565 A1* | 5/2003 | Walter | G06F 18/231 |
| 2018/0189667 A1* | 7/2018 | Tsou | G06N 5/01 |
| 2019/0026489 A1* | 1/2019 | Nerurkar | G16H 10/60 |
| 2020/0151610 A1* | 5/2020 | Chueh | G06N 20/20 |
| 2020/0327357 A1* | 10/2020 | Karnagel | G06F 18/2148 |

(Continued)

OTHER PUBLICATIONS

Hassan MA, Khalil A, Kaseb S, Kassem MA. Exploring the potential of tree-based ensemble methods in solar radiation modeling. Applied Energy. Oct. 1, 2017;203:897-916. (Year: 2017).*

(Continued)

*Primary Examiner* — Oluwatosin Alabi
(74) *Attorney, Agent, or Firm* — Osha Bergman Watanabe & Burton LLP

(57) ABSTRACT

An information processing method includes: obtaining a first evaluation result representing performance of a first machine learning model having learned using first learning data, the first evaluation result being calculated using first validation data; obtaining a second evaluation result representing performance of a second machine learning model having learned using second learning data, the second evaluation result being calculated using second validation data; and calculating, based on the first evaluation result and the second evaluation result, a comprehensive evaluation result representing performance of a single machine learning model including the first machine learning model and the second machine learning model, the performance of the single machine learning model being predicted when the single machine learning model is applied to unevaluated, unknown data relevant to a prescribed event.

18 Claims, 24 Drawing Sheets

(56) References Cited

U.S. PATENT DOCUMENTS

2021/0089624 A1* 3/2021 Bealby-Wright ....... G10L 15/16
2021/0117869 A1* 4/2021 Plumbley ............. G06F 18/217
2021/0216916 A1* 7/2021 Madhavan .......... G06F 18/2451
2021/0256367 A1* 8/2021 Mor ................... G06Q 30/0282

OTHER PUBLICATIONS

"Control Sets: Introducing Precision, Recall, and F1 into Relatively Assisted Review,"? [online], An EDRM White Paper—part of the EDRM White Paper Series (/7596); retrieved from the Internet on Mar. 11, 2020; <URL: https://www.edrm.net/papers/control-sets-introducing-precision-recall-and-f1-into-relativity-assisted-review/>.
Rocca, Joseph, "Ensemble methods: bagging, boosting and stacking—Understanding the key concepts of ensemble learning.", Published in Towards Data Science, Apr. 23, 2019, (24 pages); url: https://towardsdatascience.com/ensemble-methods-bagging-boosting-and-stacking-c9214a10a205.

* cited by examiner

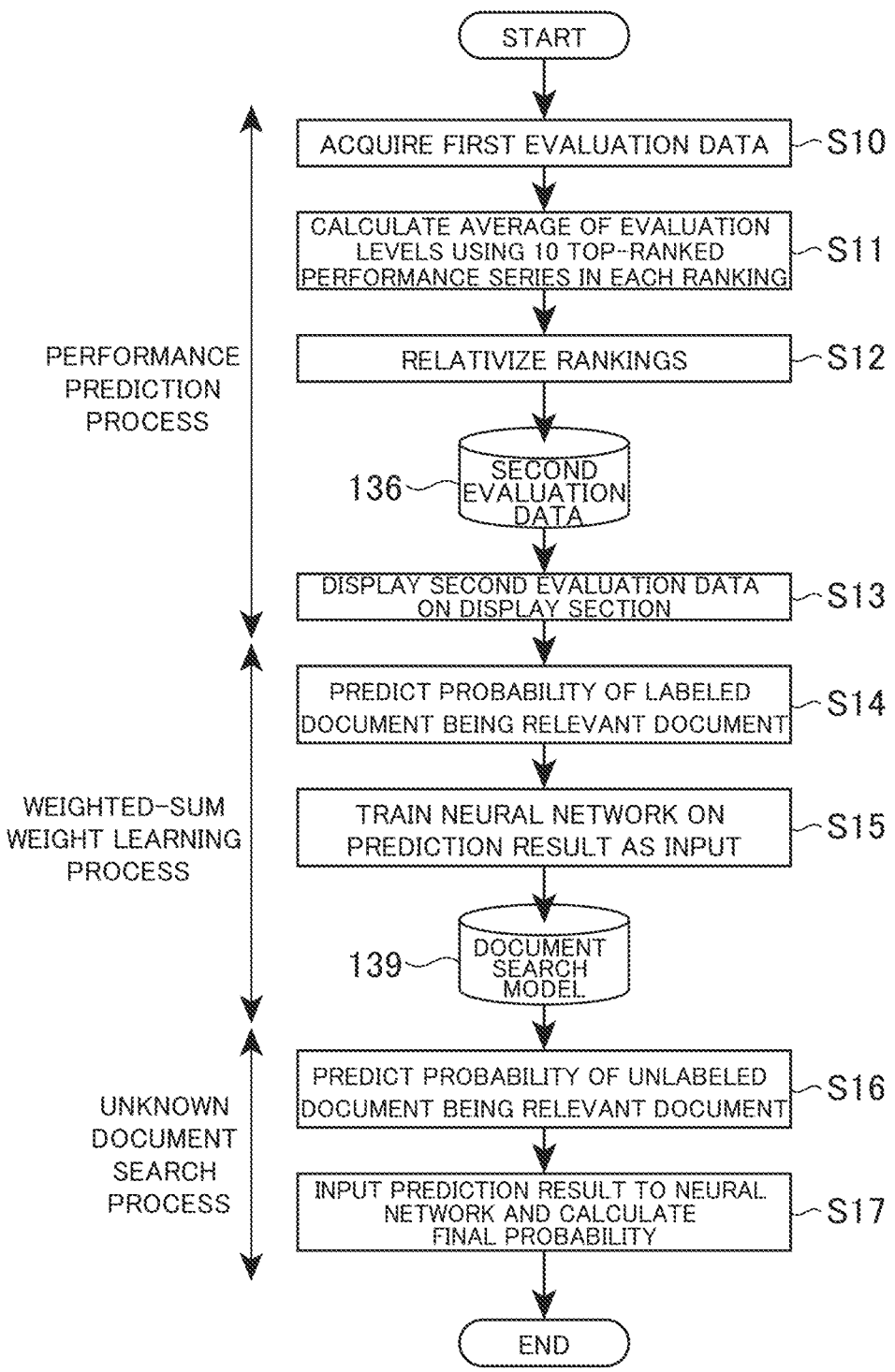

| ABSOLUTE RANKING | RELATIVE RANKING | RECALL/PRECISION/ELUSION FOR DATASET 137-1 | | | ...... | RECALL/PRECISION/ELUSION FOR DATASET 137-50 | | |
|---|---|---|---|---|---|---|---|---|
| | | R1 | P1 | E1 | | R50 | P50 | E50 |
| 1 | 0.025 | 0.0305 | 0.9975 | 0.4802 | | 0.0378 | 1.0000 | 0.4710 |
| 2 | 0.05 | 0.0555 | 0.9821 | 0.4635 | | 0.0513 | 0.9758 | 0.4703 |
| 3 | 0.075 | 0.1044 | 0.9647 | 0.4579 | | 0.0852 | 0.9590 | 0.4550 |
| 4 | 0.1 | 0.1105 | 0.9635 | 0.4520 | | 0.0958 | 0.9351 | 0.4630 |
| 5 | 0.125 | 0.1498 | 0.9433 | 0.4397 | | 0.1299 | 0.9222 | 0.4555 |
| 6 | 0.15 | 0.1983 | 0.9338 | 0.4204 | ...... | 0.1302 | 0.9177 | 0.4049 |
| 7 | 0.175 | 0.2155 | 0.9267 | 0.3996 | | 0.1701 | 0.8946 | 0.4116 |
| 8 | 0.2 | 0.2433 | 0.9164 | 0.3922 | | 0.1948 | 0.8731 | 0.3960 |
| 9 | 0.225 | 0.2533 | 0.8928 | 0.3776 | | 0.2373 | 0.8496 | 0.3852 |
| 10 | 0.25 | 0.2688 | 0.8734 | 0.3617 | | 0.2863 | 0.8256 | 0.3737 |
| ⋮ | ⋮ | ⋮ | ⋮ | ⋮ | | ⋮ | ⋮ | ⋮ |
| 40 | 1 | 1.0000 | 0.4917 | 0.0000 | | 1.0000 | 0.4706 | 0.0000 |

FIG.5E

RECALL FOR 50 DATASETS 137

| ABSOLUTE RANKING | RELATIVE RANKING | R1 | R2 | ...... | R50 |
|---|---|---|---|---|---|
| 1 | 0.025 | 0.0305 | 0.0188 | ...... | 0.0378 |
| 2 | 0.05 | 0.0555 | 0.0371 | | 0.0513 |
| 3 | 0.075 | 0.1044 | 0.0603 | | 0.0852 |
| 4 | 0.1 | 0.1105 | 0.0642 | | 0.0958 |
| 5 | 0.125 | 0.1498 | 0.0680 | | 0.1299 |
| 6 | 0.15 | 0.1983 | 0.1073 | | 0.1302 |
| 7 | 0.175 | 0.2155 | 0.1092 | | 0.1701 |
| 8 | 0.2 | 0.2433 | 0.1333 | | 0.1948 |
| 9 | 0.225 | 0.2533 | 0.1752 | | 0.2373 |
| 10 | 0.25 | 0.2688 | 0.2114 | | 0.2863 |
| ...... | ...... | ...... | ...... | | ...... |
| 40 | 1 | 1.0000 | 1.0000 | | 1.0000 |

AVERAGE OF RECALL VALUES IN TOP-RANKED 10 DATASETS IS CALCULATED

| ABSOLUTE RANKING | RELATIVE RANKING | RECALL (Rpre) FOR PERFORMANCE PREDICTION SERIES |
|---|---|---|
| 1 | 0.025 | 0.0290 |
| 2 | 0.05 | 0.0480 |
| 3 | 0.075 | 0.0833 |
| 4 | 0.1 | 0.0902 |
| 5 | 0.125 | 0.1159 |
| 6 | 0.15 | 0.1453 |
| 7 | 0.175 | 0.1650 |
| 8 | 0.2 | 0.1905 |
| 9 | 0.225 | 0.2219 |
| 10 | 0.25 | 0.2555 |
| ...... | ...... | ...... |
| 40 | 1 | 1.0000 |

FIG.5F

| ABSOLUTE RANKING | RELATIVE RANKING | PRECISION FOR 50 DATASETS 137 | | | |
|---|---|---|---|---|---|
| | | P1 | P2 | ....... | P50 |
| 1 | 0.025 | 0.9975 | 0.9994 | | 1.0000 |
| 2 | 0.05 | 0.9821 | 0.9818 | | 0.9758 |
| 3 | 0.075 | 0.9647 | 0.9747 | | 0.9590 |
| 4 | 0.1 | 0.9635 | 0.9730 | | 0.9351 |
| 5 | 0.125 | 0.9433 | 0.9528 | | 0.9222 |
| 6 | 0.15 | 0.9338 | 0.9406 | | 0.9177 |
| 7 | 0.175 | 0.9267 | 0.9163 | | 0.8946 |
| 8 | 0.2 | 0.9164 | 0.8956 | | 0.8731 |
| 9 | 0.225 | 0.8928 | 0.8869 | | 0.8496 |
| 10 | 0.25 | 0.8734 | 0.8682 | | 0.8256 |
| ....... | ....... | | | | |
| 40 | 1 | 0.4917 | 0.5000 | | 0.4706 |

AVERAGE OF PRECISION VALUES IN TOP-RANKED 10 DATASETS IS CALCULATED

| ABSOLUTE RANKING | RELATIVE RANKING | PRECISION (Ppre) FOR PERFORMANCE PREDICTION SERIES |
|---|---|---|
| 1 | 0.025 | 0.9990 |
| 2 | 0.05 | 0.9799 |
| 3 | 0.075 | 0.9661 |
| 4 | 0.1 | 0.9572 |
| 5 | 0.125 | 0.9394 |
| 6 | 0.15 | 0.9307 |
| 7 | 0.175 | 0.9125 |
| 8 | 0.2 | 0.8950 |
| 9 | 0.225 | 0.8764 |
| 10 | 0.25 | 0.8557 |
| ....... | ....... | ....... |
| 40 | 1 | 0.4874 |

FIG. 5G

| ABSOLUTE RANKING | RELATIVE RANKING | ELUSION FOR 50 DATASETS 137 | | | |
|---|---|---|---|---|---|
| | | E1 | E2 | ...... | E50 |
| 1 | 0.025 | 0.4802 | 0.4806 | ...... | 0.4710 |
| 2 | 0.05 | 0.4635 | 0.4660 | ...... | 0.4703 |
| 3 | 0.075 | 0.4579 | 0.4666 | ...... | 0.4550 |
| 4 | 0.1 | 0.4520 | 0.4592 | ...... | 0.4630 |
| 5 | 0.125 | 0.4397 | 0.4397 | ...... | 0.4555 |
| 6 | 0.15 | 0.4204 | 0.4218 | ...... | 0.4049 |
| 7 | 0.175 | 0.3996 | 0.4028 | ...... | 0.4116 |
| 8 | 0.2 | 0.3922 | 0.3924 | ...... | 0.3960 |
| 9 | 0.225 | 0.3776 | 0.3868 | ...... | 0.3852 |
| 10 | 0.25 | 0.3617 | 0.3704 | ...... | 0.3737 |
| ...... | ...... | ...... | ...... | ...... | ...... |
| 40 | 1 | 0.0000 | 0.0000 | 0.0000 | 0.0000 |

AVERAGE OF ELUSION VALUES IN TOP-RANKED 10 DATASETS IS CALCULATED

| ABSOLUTE RANKING | RELATIVE RANKING | ELUSION (Epre) FOR PERFORMANCE PREDICTION SERIES |
|---|---|---|
| 1 | 0.025 | 0.4776 |
| 2 | 0.05 | 0.4666 |
| 3 | 0.075 | 0.4598 |
| 4 | 0.1 | 0.4581 |
| 5 | 0.125 | 0.4450 |
| 6 | 0.15 | 0.4157 |
| 7 | 0.175 | 0.4047 |
| 8 | 0.2 | 0.3935 |
| 9 | 0.225 | 0.3832 |
| 10 | 0.25 | 0.3836 |
| ...... | ...... | ...... |
| 40 | 1 | 0.0000 |

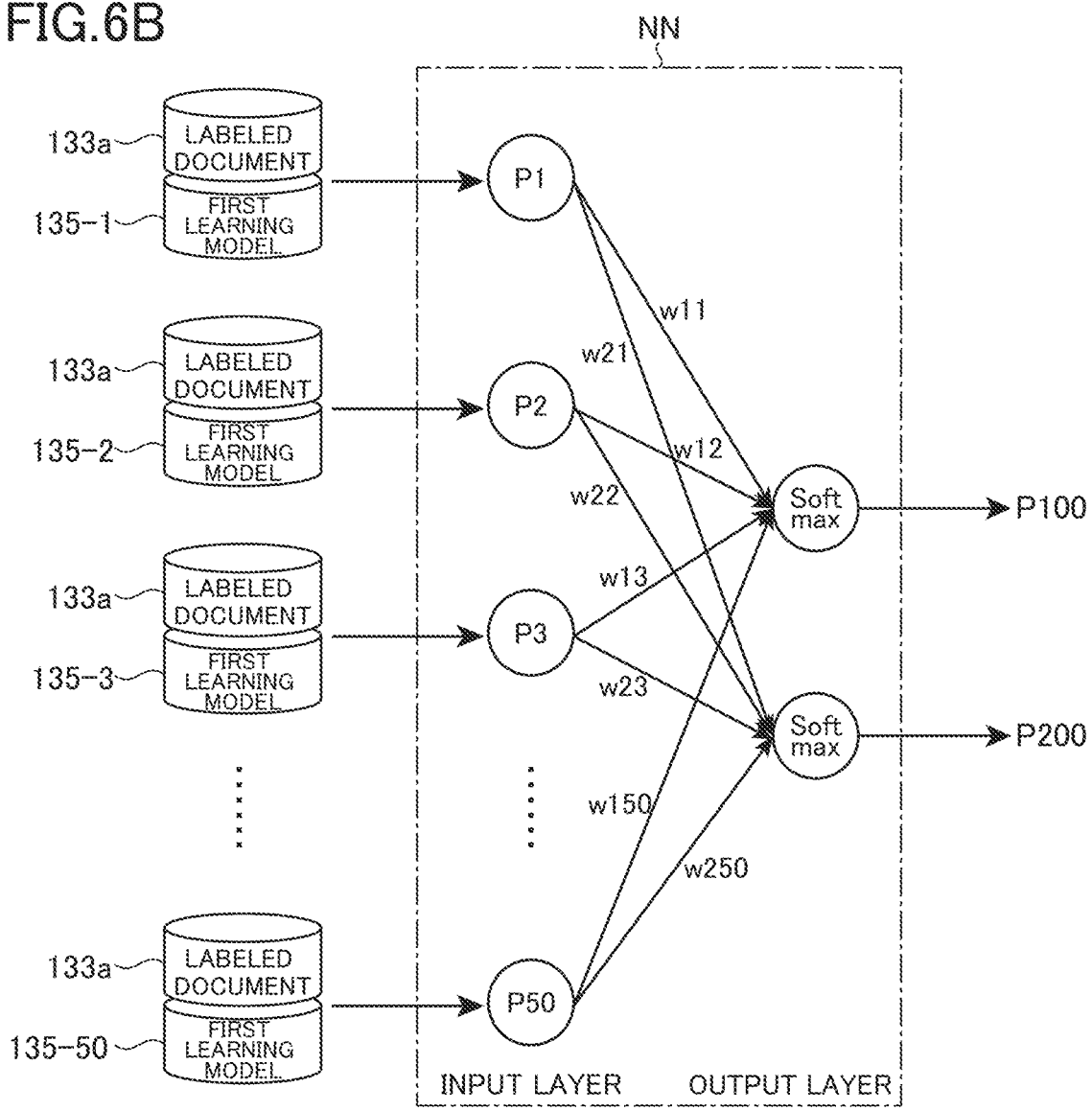

FIG.7B

RANKING OF UNREVIEWED DOCUMENTS

| ABSOLUTE RANKING | RELATIVE RANKING | DOCUMENT ID | PROBABILITY OF BEING RELEVANT AS OUTPUTTED BY NN |
|---|---|---|---|
| 1 | 0.001 | 205 | 0.924711588 |
| 2 | 0.002 | 199 | 0.88732534 |
| 3 | 0.003 | 611 | 0.861825078 |
| 4 | 0.004 | 855 | 0.856002153 |
| 5 | 0.005 | 334 | 0.797006102 |
| 6 | 0.006 | 954 | 0.755105339 |
| 7 | 0.007 | 173 | 0.749085201 |
| 8 | 0.008 | 656 | 0.735316365 |
| 9 | 0.009 | 122 | 0.734607825 |
| 10 | 0.010 | 400 | 0.71678622 |
| 11 | 0.011 | 200 | 0.710396233 |
| 12 | 0.012 | 777 | 0.665610986 |
| 13 | 0.013 | 142 | 0.665583676 |
| 14 | 0.014 | 820 | 0.59713562 |
| 15 | 0.015 | 552 | 0.570528277 |
| 16 | 0.016 | 1000 | 0.549670781 |
| 17 | 0.017 | 167 | 0.533357101 |
| 18 | 0.018 | 798 | 0.480553644 |
| 19 | 0.019 | 477 | 0.460280044 |
| 20 | 0.020 | 689 | 0.443600379 |
| 21 | 0.021 | 222 | 0.441333152 |
| 22 | 0.022 | 599 | 0.392617212 |
| 23 | 0.023 | 499 | 0.350290175 |
| 24 | 0.024 | 389 | 0.336054189 |
| 25 | 0.025 | 701 | 0.283390576 |
| 26 | 0.026 | 999 | 0.243384179 |
| 27 | 0.027 | 246 | 0.228701239 |
| 28 | 0.028 | 544 | 0.223005097 |
| 29 | 0.029 | 357 | 0.221662098 |
| 30 | 0.030 | 850 | 0.205062152 |
| ⋮ | ⋮ | ⋮ | ⋮ |
| 1000 | 1 | 194 | 0.000000012 |

FIG.7C

PERFORMANCE PREDICTION SERIES

| ABSOLUTE RANKING | RELATIVE RANKING | Rpre | Ppre | Epre |
|---|---|---|---|---|
| 1 | 0.025 | 0.0290 | 0.9990 | 0.9990 |
| 2 | 0.05 | 0.0480 | 0.9799 | 0.9799 |
| 3 | 0.075 | 0.0833 | 0.9661 | 0.9661 |
| 4 | 0.1 | 0.0902 | 0.9572 | 0.9572 |
| 5 | 0.125 | 0.1159 | 0.9394 | 0.9394 |
| 6 | 0.15 | 0.1453 | 0.9307 | 0.9307 |
| 7 | 0.175 | 0.1650 | 0.9125 | 0.9125 |
| 8 | 0.2 | 0.1905 | 0.8950 | 0.8950 |
| 9 | 0.225 | 0.2219 | 0.8764 | 0.8764 |
| 10 | 0.25 | 0.2555 | 0.8557 | 0.8557 |
| ⋮ | ⋮ | ⋮ | ⋮ | |
| 40 | 1 | 1.0000 | 0.4874 | 0.4874 |

IF UNREVIEWED DOCUMENT HAS SAME RELATIVE RANKING AS REVIEWED DOCUMENT, UNREVIEWED DOCUMENT IS PREDICTED TO HAVE EQUAL RECALL VALUE OF 0.029
↓
IF PRELIMINARY REVIEWING HAS FOUND 50% (60 OUT OF 120) ARE RELEVANT, 1,000 UNREVIEWED DOCUMENTS ARE PREDICTED TO SIMILARLY CONTAIN 50% (500) RELEVANT DOCUMENTS
↓
ACCORDINGLY, WHEN 1ST TO 25TH UNREVIEWED DOCUMENTS IN ABSOLUTE RANKING ARE REVIEWED, THEY ARE PREDICTED TO CONTAIN 2.9% OF ALL 500 RELEVANT DOCUMENTS (14.5 DOCUMENTS).

RANKING OF UNREVIEWED DOCUMENTS

| ABSOLUTE RANKING | RELATIVE RANKING | DOCUMENT ID | PROBABILITY OF BEING RELEVANT AS OUTPUTTED BY NN |
|---|---|---|---|
| 1 | 0.001 | 205 | 0.924711588 |
| 2 | 0.002 | 199 | 0.88732534 |
| 3 | 0.003 | 611 | 0.861825078 |
| 4 | 0.004 | 855 | 0.856002153 |
| 5 | 0.005 | 334 | 0.797006102 |
| 6 | 0.006 | 954 | 0.755105339 |
| 7 | 0.007 | 173 | 0.749085201 |
| 8 | 0.008 | 656 | 0.735316365 |
| 9 | 0.009 | 122 | 0.734607825 |
| 10 | 0.010 | 400 | 0.71678622 |
| 11 | 0.011 | 200 | 0.710396233 |
| 12 | 0.012 | 777 | 0.665610986 |
| 13 | 0.013 | 142 | 0.665583676 |
| 14 | 0.014 | 820 | 0.59713562 |
| 15 | 0.015 | 552 | 0.570528277 |
| 16 | 0.016 | 1000 | 0.549670781 |
| 17 | 0.017 | 167 | 0.533357101 |
| 18 | 0.018 | 798 | 0.480553644 |
| 19 | 0.019 | 477 | 0.460280044 |
| 20 | 0.020 | 689 | 0.443600379 |
| 21 | 0.021 | 222 | 0.441333152 |
| 22 | 0.022 | 599 | 0.392617212 |
| 23 | 0.023 | 499 | 0.350290175 |
| 24 | 0.024 | 389 | 0.336054189 |
| 25 | 0.025 | 701 | 0.283390576 |
| 26 | 0.026 | 999 | 0.243384179 |
| 27 | 0.027 | 246 | 0.228701239 |
| 28 | 0.028 | 544 | 0.223005097 |
| 29 | 0.029 | 357 | 0.221662098 |
| 30 | 0.030 | 850 | 0.205062152 |
| ⋮ | ⋮ | ⋮ | ⋮ |
| 1000 | 1 | 194 | 0.000000012 |

FIG.11A

CALCULATION OF TF MATRIX

| DOCUMENT ID | WORD T1 | WORD T2 | WORD T3 | ...... | WORD TM |
|---|---|---|---|---|---|
| 1 | 1 | 0 | 1 | ...... | 3 |
| 2 | 3 | 1 | 3 | ...... | 2 |
| 3 | 3 | 0 | 1 | ...... | 1 |
| 4 | 0 | 3 | 0 | ...... | 1 |
| ⋮ | ⋮ | ⋮ | ⋮ | ⋱ | ⋮ |

FIG.11B

CALCULATION OF DF

| DOCUMENT ID | WORD T1 | WORD T2 | WORD T3 | ...... | WORD TM |
|---|---|---|---|---|---|
| DF | 15 | 4 | 21 | ...... | 8 |

FIG.11C

CALCULATION OF TF-IDF MATRIX

| DOCUMENT ID | WORD T1 | WORD T2 | WORD T3 | ...... | WORD TM |
|---|---|---|---|---|---|
| 1 | 0.05 | 0 | 0.02 | ...... | 0.4 |
| 2 | 0.1 | 0.02 | 0.1 | ...... | 0.2 |
| 3 | 0.3 | 0 | 0.01 | ...... | 0.05 |
| 4 | 0 | 0.6 | 0 | ...... | 0.1 |
| ⋮ | ⋮ | ⋮ | ⋮ | ⋱ | ⋮ |

FIG.11D

CALCULATION OF MATRIX OF MAIN COMPONENTS

| DOCUMENT ID | MAIN COMPONENT C1 | MAIN COMPONENT C2 | MAIN COMPONENT C3 | ...... | MAIN COMPONENT CK |
|---|---|---|---|---|---|
| 1 | 0.0332 | 0.0161 | −0.0679 | ...... | 0.0820 |
| 2 | 0.0549 | 0.0079 | −0.0602 | ...... | 0.0182 |
| 3 | −0.0367 | 0.0182 | 0.0419 | ...... | 0.0790 |
| 4 | 0.0131 | 0.0391 | −0.0318 | ...... | −0.0516 |
| ⋮ | ⋮ | ⋮ | ⋮ | ⋱ | ⋮ |

FIG.11E

CALCULATION OF MATRIX OF MAIN COMPONENTS

|  | WORD T1 | WORD T2 | WORD T3 | ...... | WORD TM |
|---|---|---|---|---|---|
| MAIN COMPONENT C1 | −0.0410 | 0.0189 | −0.0750 | ...... | 0.0050 |
| MAIN COMPONENT C2 | −0.0074 | 0.0169 | −0.0076 | ...... | 0.0723 |
| MAIN COMPONENT C3 | −0.0128 | −0.0701 | 0.0130 | ...... | −0.0388 |
| ⋮ | ⋮ | ⋮ | ⋮ | ⋱ | ⋮ |
| MAIN COMPONENT CK | 0.0548 | −0.0212 | 0.0217 | ...... | 0.0115 |

INFORMATION PROCESSING DEVICE, INFORMATION PROCESSING METHOD, AND NON-TRANSITORY COMPUTER-READABLE MEDIUM

CROSS-REFERENCE TO RELATED APPLICATION

The present application claims priority from Japanese Patent Application No. 2020-099521 filed on Jun. 8, 2020, the content of which is hereby incorporated by reference into this application.

BACKGROUND OF THE INVENTION

1. Field of the Invention

The present invention relates to information processing devices, information processing methods, and non-transitory computer-readable media.

2. Description of the Related Art

Cross validation is a well-known technique of predicting the performance of a learning model in the field of machine learning. See, for example, "Control Sets: Introducing Precision, Recall, and F1 into Relatively Assisted Review," [online], An EDRM White Paper—part of the EDRM White Paper Series (/7596), retrieved from the Internet on Mar. 11, 2020, <URL:https://www.edrm.net/papers/control-sets-introducing-precision-recall-and-f1-into-relativity-assisted-review/>.

SUMMARY OF THE INVENTION

The present invention, in an aspect thereof, has an object to provide an information processing device, an information processing method, and a non-transitory computer-readable medium for improving the reliability of a machine learning model.

The present invention, in an aspect thereof, is directed to an information processing method including: obtaining a first evaluation result representing performance of a first machine learning model having learned using first learning data, the first evaluation result being calculated using first validation data differing from the first learning data; obtaining a second evaluation result representing performance of a second machine learning model having learned using second learning data differing from the first learning data, the second machine learning model differing from the first machine learning model, the second evaluation result being calculated using second validation data differing from the first validation data; and calculating, based on the first evaluation result and the second evaluation result, a comprehensive evaluation result representing performance of a single machine learning model including the first machine learning model and the second machine learning model, the performance of the single machine learning model being predicted when the single machine learning model is applied to unevaluated, unknown data relevant to a prescribed event, wherein the first learning data, the second learning data, the first validation data, and the second validation data are evaluated data relevant to the prescribed event.

BRIEF DESCRIPTION OF THE DRAWINGS

FIG. 4 is a flow chart representing an information processing method in accordance with the first embodiment.

FIG. 5E is a conceptual drawing illustrating a process of obtaining second evaluation data in accordance with the first embodiment.

FIG. 5F is a conceptual drawing illustrating a process of obtaining the second evaluation data in accordance with the first embodiment.

FIG. 5G is a conceptual drawing illustrating a process of obtaining the second evaluation data in accordance with the first embodiment.

FIG. 6A is a conceptual drawing illustrating a neural network in accordance with the first embodiment.

FIG. 6B is a conceptual drawing illustrating input data for the neural network in accordance with the first embodiment.

FIG. 7B is a conceptual drawing illustrating outputs of the neural network in accordance with the first embodiment.

FIG. 7C is a conceptual drawing illustrating a method of evaluating outputs of the neural network in accordance with the first embodiment.

FIG. 11A is a conceptual drawing illustrating a method of generating a TF-IDF matrix in accordance with the second embodiment.

FIG. 11B is a conceptual drawing illustrating a method of generating a TF-IDF matrix in accordance with the second embodiment.

FIG. 11C is a conceptual drawing illustrating a method of generating a TF-IDF matrix in accordance with the second embodiment.

FIG. 11D is a conceptual drawing illustrating a method of generating a TF-IDF matrix in accordance with the second embodiment.

FIG. 11E is a conceptual drawing illustrating a method of generating a TF-IDF matrix in accordance with the second embodiment.

DETAILED DESCRIPTION OF THE INVENTION

Figure 1:
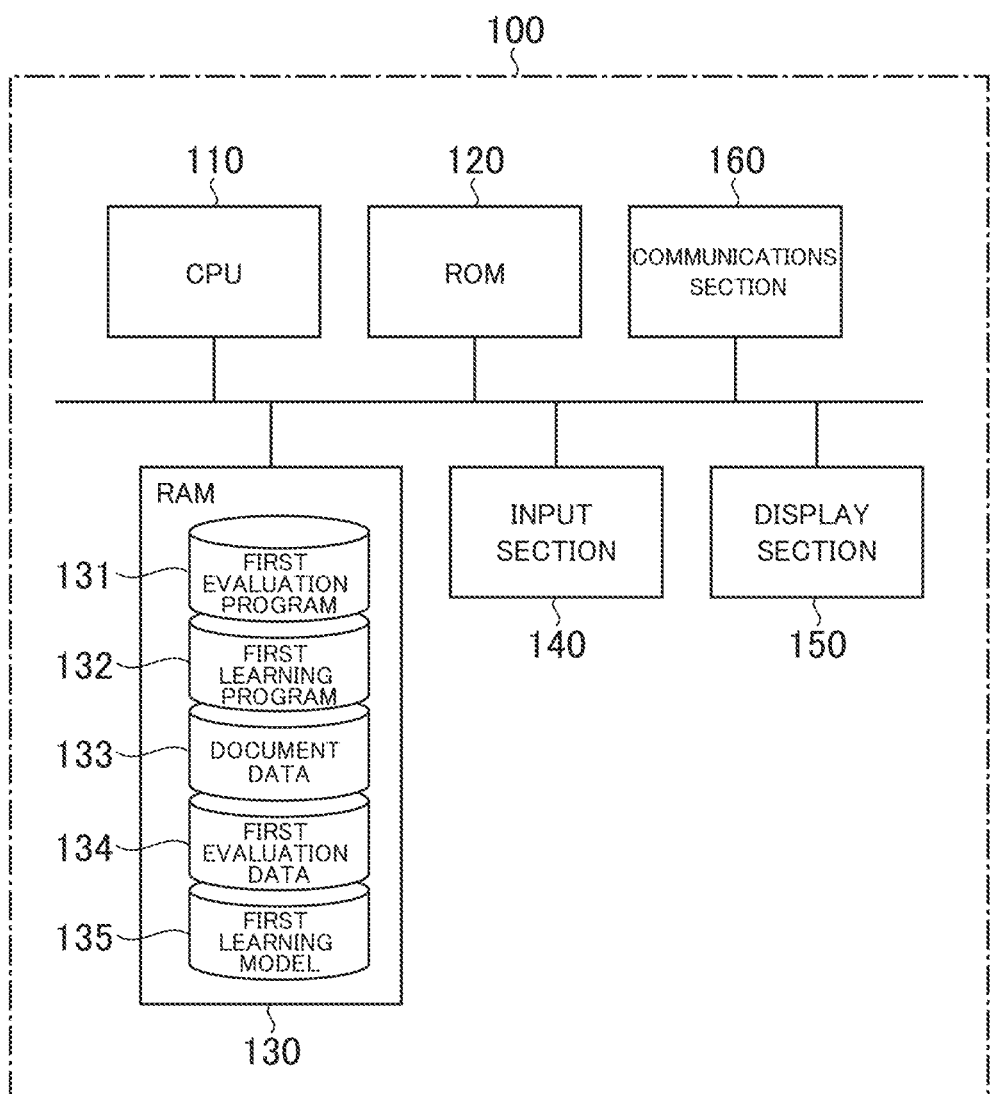
FIG. 1 is a block diagram of an example of an information processing device in accordance with a first embodiment.

The following will describe embodiments of the present invention with reference to drawings. Identical and equivalent elements in the drawings are denoted by the same reference numerals, and description thereof is not repeated.

The present specification describes information processing devices that extract documents relevant to an event from numerous documents and rank the extracted documents in accordance with the relevance thereof. The devices perform this ranking by means of a model built by machine learning and evaluate the performance of the model with high accuracy. Each document may be electronic data of any format partially containing, for example, characters, numeric characters, and symbols. The document is, for example, document data (e.g., emails, conference minutes, specifications, user manuals, various technical documents, various reports, contracts, business documents, business plans, electronic medical records, and Web pages), presentation data, spreadsheet data, and images and videos containing characters. The event may be any subject the relevance of each document to which is evaluated by the user (reviewer). Examples of the event include lawsuits, misconduct such as information leaks, violations of law and regulation compliance, and harassments, as well as divorces, accidents, and illness.

The following description assumes, as an example, that the event is a lawsuit filed in the United States of America and that the reviewer reviews documents by using the information processing device. When a lawsuit is filed in the US, the parties to the lawsuit may have to go through discovery. More specifically, the parties may have to submit documents relevant to the lawsuit to the court to disclose them in court procedures. To do so, they need to categorize documents into those relevant to the lawsuit and those non-relevant to the lawsuit so that they can only submit the relevant documents.

The reviewer therefore has to review documents potentially relevant to the lawsuit (hereinafter, will be referred to as a "population") and evaluate each document as being, for example, "relevant to the lawsuit" or "non-relevant to the lawsuit." The review process needs to be done efficiently because the population is often very large (e.g., possibly containing tens of thousands to millions of documents).

The information processing device in accordance with the present specification, for example, evaluates the potential relevance of documents to a lawsuit by means of a machine learning model and also presents the documents to the reviewer in descending order of the potential relevance thereof. The information processing device, for example, also presents the reliability of a model built by machine learning to the reviewer with high accuracy.

First Embodiment

A description is given now of an information processing device, an information processing method, and a non-transitory computer-readable medium in accordance with a first embodiment of the present invention. The first embodiment describes the device, method, and medium in relation to discovery procedures as an example, which however by no means limits the scope of the invention.

Configuration

FIG. 1 is a block diagram of an information processing device 100 in accordance with the present embodiment. The information processing device 100 needs only to include a processor capable of machine learning and is, for example, a personal computer.

Figure 2A:
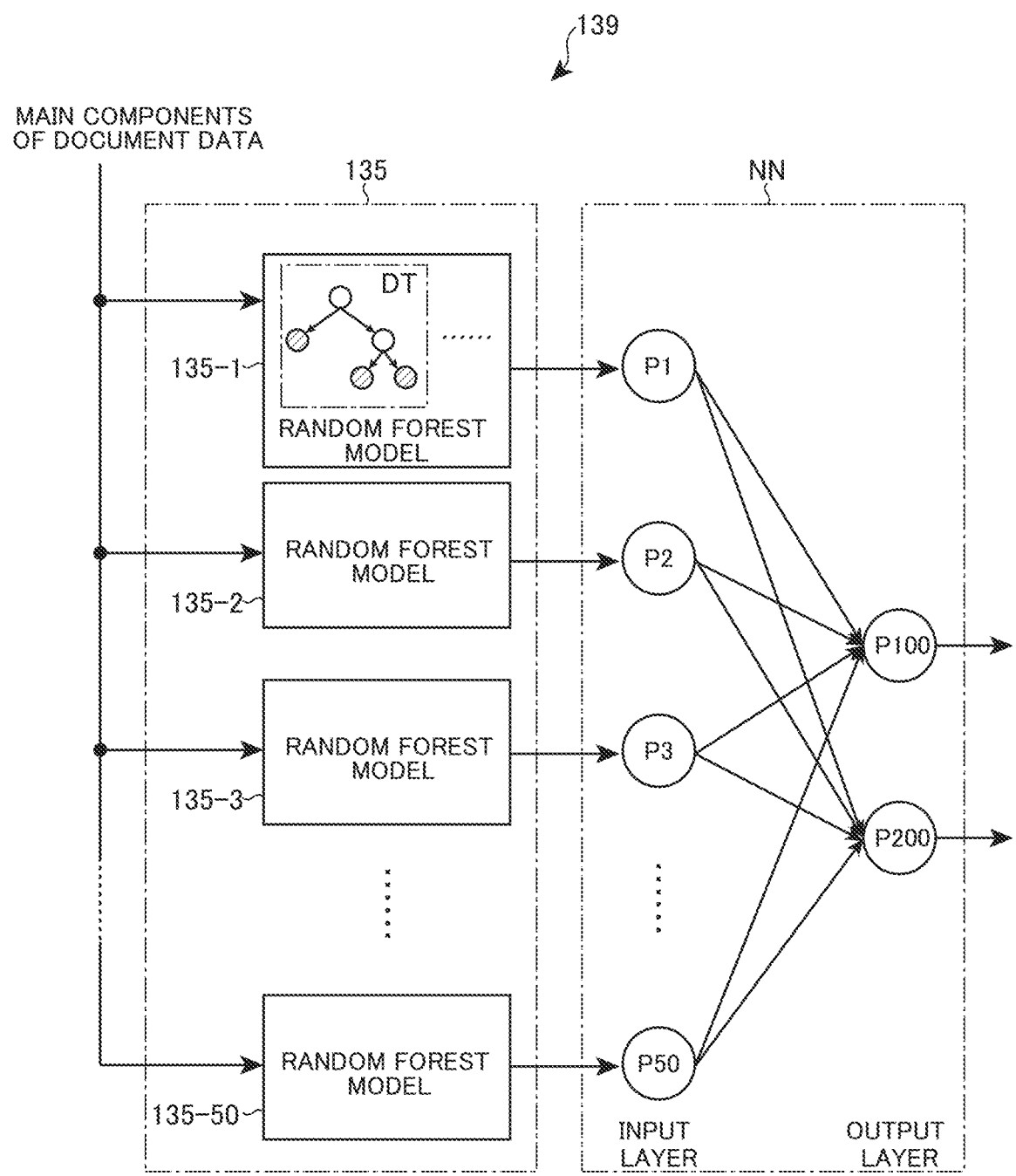
FIG. 2A is a conceptual drawing illustrating a document search model in accordance with the first embodiment.

As described above, the information processing device 100, for example, evaluates the potential relevance of documents to a lawsuit and also presents the documents to the reviewer in descending order of the potential relevance. To this purpose, the information processing device 100 generates a document search model 139 for calculating the probability of the documents being relevant to the lawsuit, by combining two or more machine learning models. An example of the document search model 139 is now described briefly with reference to FIG. 2A. FIG. 2A is a conceptual drawing illustrating an example of the document search model 139 in accordance with the present embodiment. FIG. 2A gives a mere example, which by no means limits the present embodiment.

Referring to FIG. 2A, the document search model 139 includes a first learning model 135 (first-step learning model) and a second learning model NN (second-step learning model). The first learning model 135 includes a plurality of, for example, random forest models. In the example of FIG. 2A, the first learning model 135 includes a random forest model 135-1 (first machine learning model), a random forest model 135-2 (second machine learning model), a random forest model 135-3 (third machine learning model), . . . , and the random forest model 135-50. The random forest models 135-1 to 135-50 have mutually different settings including, for example, branching node counts and leaf node counts. The random forest model 135-1 has already learned using first learning data and first validation data for which relevance (or lack of relevance) to the lawsuit is known. The random forest model 135-2 has already learned using second learning data and second validation data for which relevance (or lack of relevance) to the lawsuit is known. The random forest model 135-3 has already learned using third learning data and third validation data for which relevance (or lack of relevance) to the lawsuit is known. A similar description applies to the other random forest models 135-4 to 135-50. The random forest models 135-1 to 135-50 will be described in detail in a second embodiment. The second learning model NN is a neural network. The neural network NN in this example includes an input layer and an output layer, but no intermediate layer. Alternatively, the neural network NN may include an intermediate layer.

In this configuration, for example, a main component, which again will be described in detail in the second embodiment, of an unknown document whose relevance (or whose lack of relevance) to the lawsuit is not known is fed to the random forest models 135-1 to 135-50. The random forest models 135-1 to 135-50 then output respective probabilities P1 to P50 of the unknown document being relevant to the lawsuit for input to the neural network NN. The neural network NN eventually outputs a probability P100 of the unknown document being relevant to the lawsuit and a probability P200 of the unknown document being non-relevant to the lawsuit on the basis of the inputted probabilities P1 to P50.

In the present embodiment, the information processing device 100 already has available the first learning model 135 and learning data using which the first learning model 135 will learn. The following will describe how the information processing device generates the document search model 139 shown in FIG. 2A and predicts the performance of the document search model 139 (generates a comprehensive evaluation result) on the basis of the first learning model 135 and the learning data.

Going back to FIG. 1, a description is now given of the configuration of the information processing device 100. As shown in FIG. 1, the information processing device 100 includes a processor 110, a ROM 120, a RAM 130, an input section 140, a display section 150, and a communications section 160.

The ROM 120 contains programs executed by the processor 110 and necessary data.

The RAM 130 provides a working area to the processor 110. The RAM 130 contains a first evaluation program 131, a first learning program 132, document data 133, first evaluation data 134, and the first learning model 135. The first evaluation program 131 evaluates a machine learning model that determines whether or not a document is relevant to an event. The first learning program 132 causes a computer to learn a machine learning model. The first evaluation program 131 and the first learning program 132 may be provided as separate programs or a single consolidated program. The programs 131 and 132 will be described later in detail. The document data 133 is data on documents potentially relevant to an event. The document data 133 includes labeled documents and unlabeled documents. A labeled document is a document that has been reviewed in advance by the reviewer (i.e., that has been subjected to "preliminary reviewing"), so that it is known whether the labeled document is relevant or non-relevant to the lawsuit. A labeled document is a relevant document. On the other hand, an unlabeled document has not been subjected to preliminary reviewing and is not known to be relevant or non-relevant to the lawsuit. The first learning model 135 is a machine learning model applied to the document data 133 and includes, for example, the random forest models 135-1 to 135-50 described with reference to FIG. 2A. The first evaluation data 134 is an evaluation result, representing the performance of the first learning model 135, that is obtained by applying the first learning model 135 to the labeled documents in the document data 133. The first learning model 135 is, for example, a set of random forest models that have different depths and leaf nodes. The first evaluation data 134 is an evaluation result obtained by means of these random forest models. A set of first evaluation data is obtained for each random forest model. In other words, the first evaluation data 134 includes an evaluation result for the random forest model 135-1 (first evaluation result), an evaluation result for the random forest model 135-2 (second evaluation result), and an evaluation result for the random forest model 135-3 (third evaluation result). A similar description applies to the other random forest models 135-4 to 135-50. How the first learning model 135 is generated and how the first evaluation data 134 is obtained will be described in detail in the second embodiment.

Figure 2B:
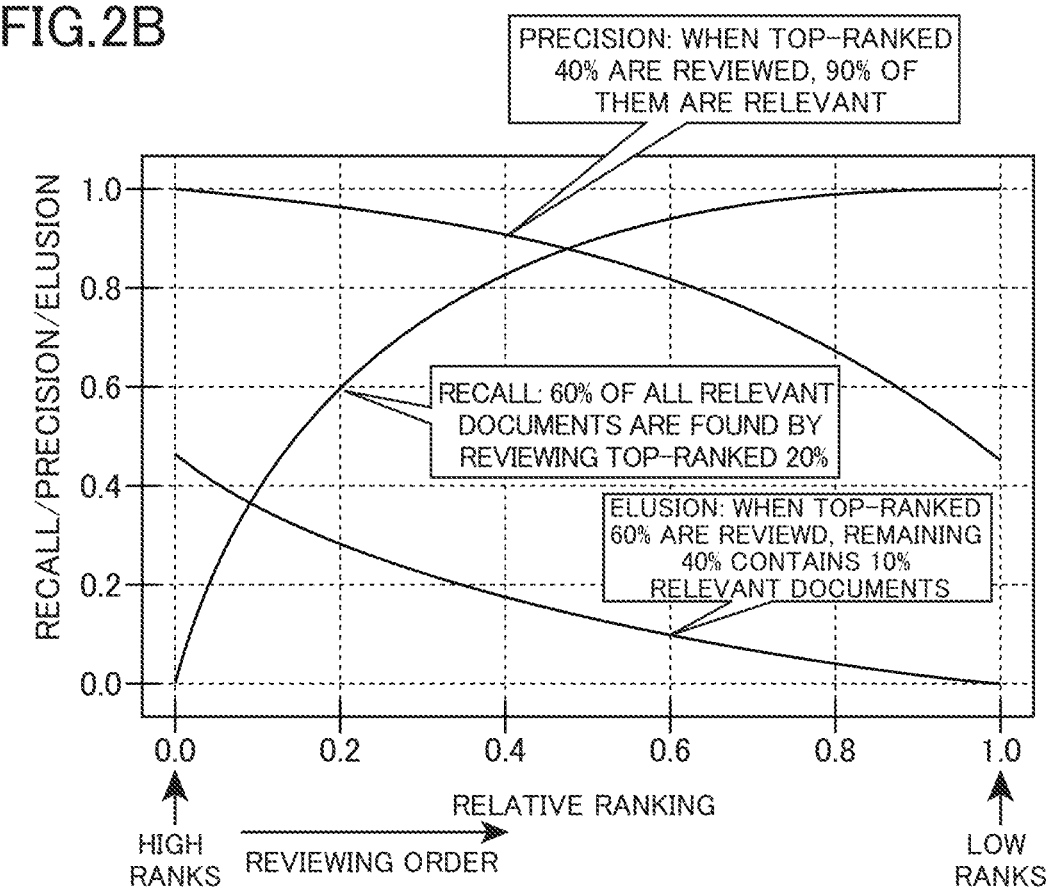
FIG. 2B is a conceptual drawing illustrating first evaluation data in accordance with the first embodiment.

FIG. 2B is a conceptual drawing illustrating the first evaluation data 134 obtained from a random forest model by using a portion of the document data 133. Referring to FIG. 2B, the first evaluation data 134 contains recall, precision, and elusion. Recall indicates the ratio of discovered relevant documents to all the relevant documents when the reviewing is finished up to a stage. Precision indicates the ratio of relevant documents to all the reviewed documents when the reviewing is finished up to a stage. Elusion indicates the ratio of relevant documents in the remaining, unreviewed documents to all the relevant documents when the reviewing is finished up to a stage.

Assume, as an example, that the document data 133 contains 1,120 documents, and a random forest model learns using 120 out of the 1,120 documents, for the purpose of a validation. Under these conditions, the random forest model calculates the probability of each document being relevant to the lawsuit, and an evaluation result acquisition section, which will be described later in detail, ranks the documents in descending order of the calculated probabilities to obtain information needed to display a graph such as the one shown in FIG. 2B. In FIG. 2B, the horizontal axis represents the relative ranking of documents with 0.0 representing the highest rank and 1.0 representing the lowest rank. The vertical axis represents recall, precision, and elusion.

In the example of FIG. 2B, the recall is 0.6 for the relative ranking of 0.2. These figures indicate that 60% of all relevant documents in the 120 documents are discovered by reviewing the top-ranked 20% of the documents when the documents are reviewed in descending order of the ranking. The precision is 0.9 for the relative ranking of 0.4. These figures indicate that 90% of reviewed documents are relevant documents when the top-ranked 40% of the documents are reviewed. The elusion is 0.1 for the relative ranking of 0.6. These figures indicate that 10% of the remaining, unreviewed documents (40% of all the documents) are relevant documents when the top-ranked 60% of the documents are reviewed. The precision and elusion increase with an increase in the relative ranking. The recall increases with a decrease in the relative ranking. The elusion and the precision are equal to the proportion (richness) of relevant documents in all the documents when the relative ranking is equal to 0 (highest-rank) and 1.0 (lowest-rank) respectively.

The first evaluation data 134 includes a set of evaluation results obtained from a plurality of random forest models such as the one shown in FIG. 2B. For instance, when there are 50 random forest models available, the first evaluation data 134 includes 50 evaluation results. The set of evaluation results shown in FIG. 2B may be referred to as a "performance evaluation series" in the following description. Specifically, for example, a performance evaluation series includes the aforementioned recall, precision, and elusion of each random forest model.

Going back again to FIG. 1, the processor 110 is a CPU or other like computing device. The processor 110 executes the first learning program 132 to generate a document search model using results from the first learning model 135 and a neural network. The processor 110 further searches unknown documents (i.e., documents whose relevance (or whose lack of relevance) to the lawsuit is unknown). The processor 110 also executes the first evaluation program 131 to predict the performance of the document search model obtained by executing the first learning program 132.

Figure 3:
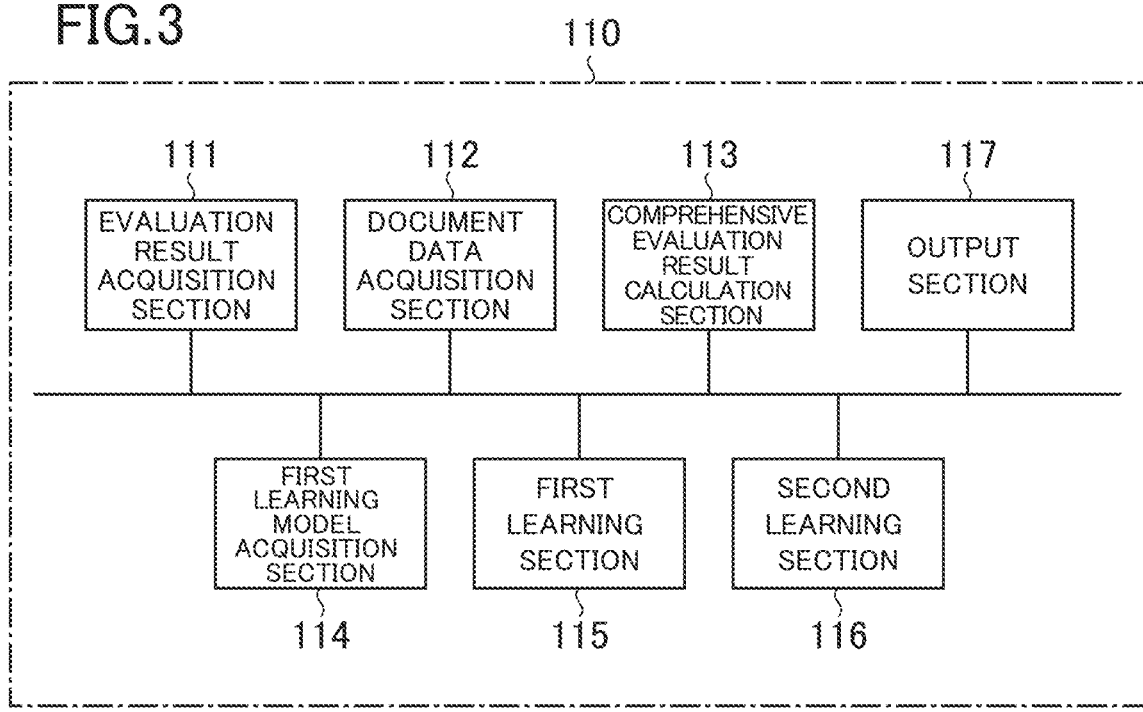
FIG. 3 is a functional block diagram of a processor in accordance with the first embodiment.

FIG. 3 is a functional block diagram of the processor 110 in executing the first evaluation program 131 and the first learning program 132. Referring to FIG. 3, the processor 110 serves as an evaluation result acquisition section 111, a document data acquisition section 112, a comprehensive evaluation result calculation section 113, a first learning model acquisition section 114, a first learning section 115, a second learning section 116, and an output section 117.

The evaluation result acquisition section 111 acquires a plurality of evaluation results representing the performance of a plurality of learning models that have different settings and that have learned and been validated using a plurality of different datasets. Specifically, the evaluation result acquisition section 111 retrieves a plurality of evaluation results (first evaluation data 134) from the RAM 130. The plurality of evaluation results is, for example, the recall, precision, and elusion described with reference to FIG. 2B, that is, the performance evaluation series, for the learned random forest models 135-1 to 135-50 described with reference to FIG. 2A. A brief description is now given of learning data used to generate the random forest models 135-1 to 135-50. The dataset that serves as the learning data is, for example, is an equivalent of some first (labeled) documents in the document data 133. More specifically, when there are 1,120 documents, the dataset is an equivalent of the 120 documents extracted first in a prescribed order. The plurality of different datasets includes, for example, 80 sets of learning data, which is the first two thirds of, for example, 120 rearranged labeled documents, and the remaining 40 sets of validation data. Such datasets are prepared, for example, for 50 random forest models. The 50 random forest models then learn using the respective sets of learning data in the prepared datasets. The learned random forest models 135-1 to 135-50 are thus obtained. In addition, evaluation results for the learned random forest models 135-1 to 135-50 are obtained by validating using the respective sets of validation data in the prepared datasets. Note that, as described earlier, "learning models with different settings" correspond to models with, for example, different depths and leaves when it is assumed that the models are random forest models. In other words, different learning models use the same algorithm (e.g., random forest model). The learning model is not necessarily a random forest model and may be a different learning model. Specific examples of the datasets will be given in the second embodiment.

The document data acquisition section 112 retrieves the document data 133 from the RAM 130. The comprehensive evaluation result calculation section 113 calculates the performance of a plurality of learning models with different settings on the basis of a plurality of evaluation results. Specifically, the comprehensive evaluation result calculation section 113 calculates, for example, a final comprehensive evaluation result for the document search model 139 (i.e., learning model including a plurality of learning models) described with reference to FIG. 2A, that is, calculates, for example, the recall and precision of the entire learning model including a plurality of learning models, by using, for example, the evaluation results obtained by the 50 random forest models 135-1 to 135-50 using the validation data shown in FIG. 2A (i.e., the first evaluation data 134). This comprehensive evaluation result may be referred to as the "performance prediction series" in the present specification.

The first learning model acquisition section 114 retrieves the aforementioned first learning model 135 from the RAM 130. The first learning section 115 calculates the probability of the documents in the document data 133 being relevant documents by means of the first learning model 135. The second learning section 116 generates the aforementioned document search model and also searches unknown documents. The output section 117 outputs the performance prediction series obtained by the comprehensive evaluation result calculation section 113 and a search result of unknown documents obtained by the second learning section 116.

Going back again to FIG. 1, the input section 140 is, for example, a keyboard and a mouse and receives various data input from the user of the information processing device 100. The display section 150 is, for example, a display device and displays the progress of the processes performed by the processor 110. Specifically, the display section 150 displays, for example, the performance evaluation series, the performance prediction series, and the search result of unknown documents. The communications section 160 receives data via, for example, wired or wireless communication line. The communications section 160 may receive the various programs 131, 132 and data 133, 134, 135 in the RAM 130.

Operation

A description is now given of the operation of the information processing device 100 in accordance with the present embodiment with reference to FIG. 4. FIG. 4 is a flow chart representing the flow of a process performed by the information processing device 100. Referring to FIG. 4, the process broadly includes a performance prediction process, a weighted-sum weight learning process, and an unknown document search process.

First, the processor 110 in the information processing device 100 executes the first evaluation program 131 to perform a performance prediction process. In other words, the evaluation result acquisition section 111 in the processor 110 acquires the first evaluation data 134 from the RAM 130 (step S10). As described with reference to FIGS. 2A and 2B, when there are prepared 50 random forest models available, 50 performance evaluation series are obtained. Next, the comprehensive evaluation result calculation section 113 calculates an average of evaluation levels (recall, precision, and elusion) by using 10 series that are top-ranked in performance in each ranking in FIG. 2B (step S11). Then, the ranking is relativized again on the basis of the result obtained in step S11 (step S12). The result obtained in step S12 is stored as second evaluation data 136 in the RAM 130. This second evaluation data 136 is the aforementioned comprehensive evaluation result and a performance prediction series. This performance prediction series represents the performance predicted for the document search model 139 obtained by subsequent weighted-sum weight learning. The performance prediction series is then outputted by, for example, the output section 117 to the display section 150 for a display for the reviewer (step S13).

Next, the processor 110 in the information processing device 100 executes the first learning program 132 to perform a weighted-sum weight learning process and an unknown document search process one after the other. In other words, the first learning model acquisition section 114 acquires the first learning model 135 from the RAM 130. In addition, the document data acquisition section 112 acquires labeled documents in the document data 133 from the RAM 130. The first learning section 115 then predicts the probability of the labeled documents being relevant to the lawsuit by using the first learning model 135, in other words, for example, 50 learned random forest models (step S14). The second learning section 116 continues the process by training the neural network NN on the prediction result obtained in step S14 as an input (step S15). This process hence generates the document search model 139 which is a single machine learning model including a random forest model and a neural network.

Next, the processor 110 performs an unknown document search process. In other words, the document data acquisition section 112 acquires unlabeled documents in the document data 133 from the RAM 130. The first learning section 115 then predicts the probability of the unlabeled documents being relevant to the lawsuit by using the first learning model 135, in other words, for example, 50 learned random forest models (step S16). The second learning section 116 continues the process by feeding the prediction result obtained in step S16 to the neural network NN (step S17). The probability of the unknown documents being relevant documents is thus outputted from the neural network NN.

Figure 5A:
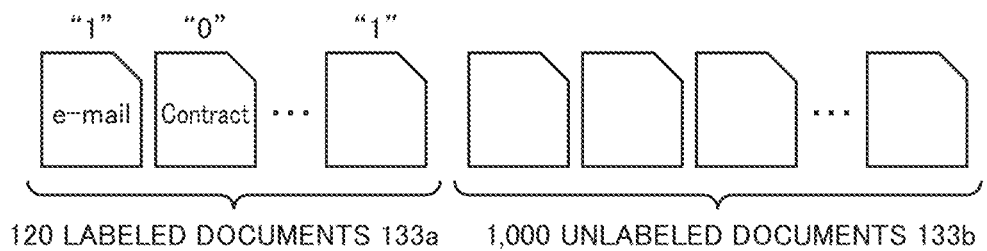
FIG. 5A is a conceptual drawing illustrating document data in accordance with the first embodiment.

This operation is further described by way of specific examples. First, a description is given of the first evaluation data (performance evaluation series) 134 acquired in step S10. As described earlier, the first evaluation data 134 is acquired on the basis of the document data 133 and the first learning model 135. FIG. 5A is a conceptual drawing illustrating the document data 133. As described earlier, the document data 133 is the entire electronic data relevant to the lawsuit and contains 1,120 documents in the present example. Among these documents, 120 documents are labeled in preliminary reviewing (labeled documents 133a). Label "1" indicates that the document is relevant to the lawsuit, whereas label "0" indicates that the document is not relevant. One of these labels is given to each document 133a. The remaining 1,000 documents are yet to pre-reviewed (unlabeled documents 133b).

Figure 5B:
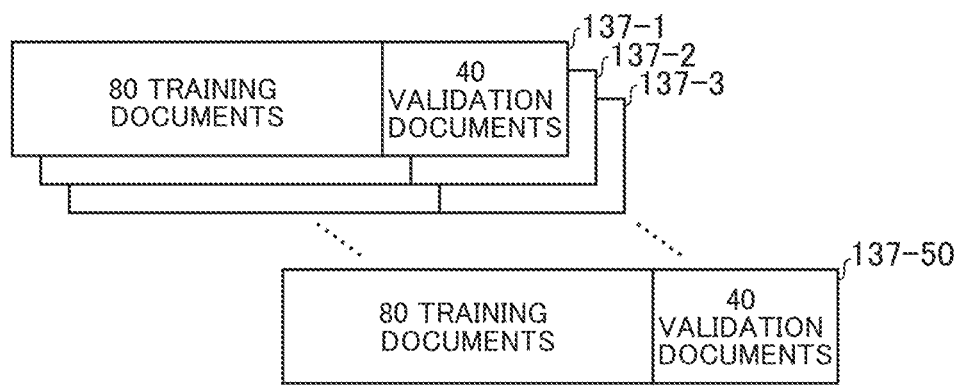
FIG. 5B is a conceptual drawing illustrating document data in accordance with the first embodiment.

50 datasets are then generated using the labeled documents 133a. The first evaluation data 134 is obtained on the basis of these datasets and the first learning model 135 (e.g., 50 random forest models with different settings). FIG. 5B is a conceptual drawing illustrating 50 datasets 137 (137-1 to 137-50). Referring to FIG. 5B, each dataset 137 includes, for example, 80 training documents, which is two thirds of the labeled documents 133a, and 40 validation documents, which is the remaining one third of the labeled documents 133a. The datasets 137-1 to 137-50 include the same 120 documents, whereas different sets of documents constitute the training documents and different sets of documents constitute the validation documents. The dataset 137 and the random forest model will be described in detail the second embodiment.

Figures 5C, 5D:
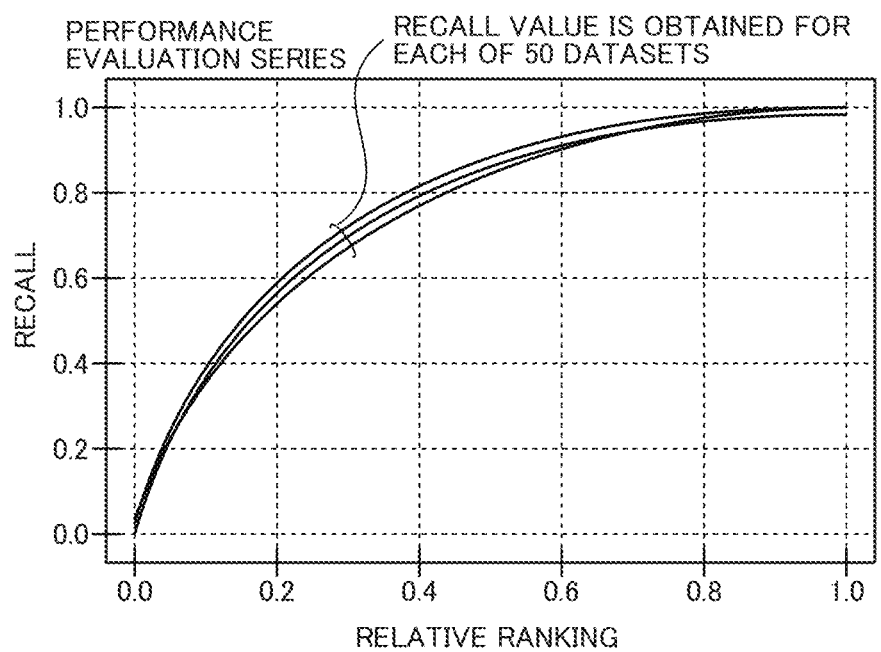
FIG. 5C is a conceptual drawing illustrating the first evaluation data in accordance with the first embodiment.
FIG. 5D is a conceptual drawing illustrating the first evaluation data in accordance with the first embodiment.

FIG. 5C is a conceptual drawing illustrating the first evaluation data 134 acquired in step S10. Referring to FIG. 5C, rankings, recalls R1 to R50, precisions P1 to P50, and elusions E1 to E50 are obtained for the 40 validation documents in each dataset 137-1 to 137-50. Similarly to FIG. 2B, FIG. 5D is a graphical representation of recalls. In this manner, 50 performance evaluation series are obtained on the basis of the 50 datasets 137-1 to 137-50.

Next, a description is given of steps S11 and S12. FIG. 5E shows recalls and related data. Referring to FIG. 5E, in step S11, an average is calculated of the values of the top-ranked 10 recalls out of the 50 recalls R1 to R50 for each ranking. For instance, in the relative ranking of 0.125, the recalls R1 to R50 in the performance evaluation series are:

R1=0.1498
R2=0.0680
. . .
R50=0.1299.

A larger recall value indicates better performance. Accordingly, an average value is calculated of the top-ranked 10 recalls, which have the largest values, out of R1 to R50. The result is a recall Rpre for the relative ranking of 0.125 in the performance prediction series. In the present example, for example, Rpre is equal to 0.1159. This calculation is performed for each ranking to obtain the recalls Rpre in the performance prediction series.

FIG. 5F shows precisions and related data, and FIG. 5G shows elusions and related data. Referring to FIG. 5F, similarly to the recall, a larger precision value indicates better performance. Accordingly, an average value is calculated of the 10 precisions with the largest values for each ranking. The result is a precision Ppre in the performance prediction series. On the other hand, as shown in FIG. 5G, a smaller elusion value indicates better performance. Accordingly, an average value is calculated of the 10 elusions with the smallest values for each ranking. The result is an elusion Epre in the performance prediction series.

Figure 5H:
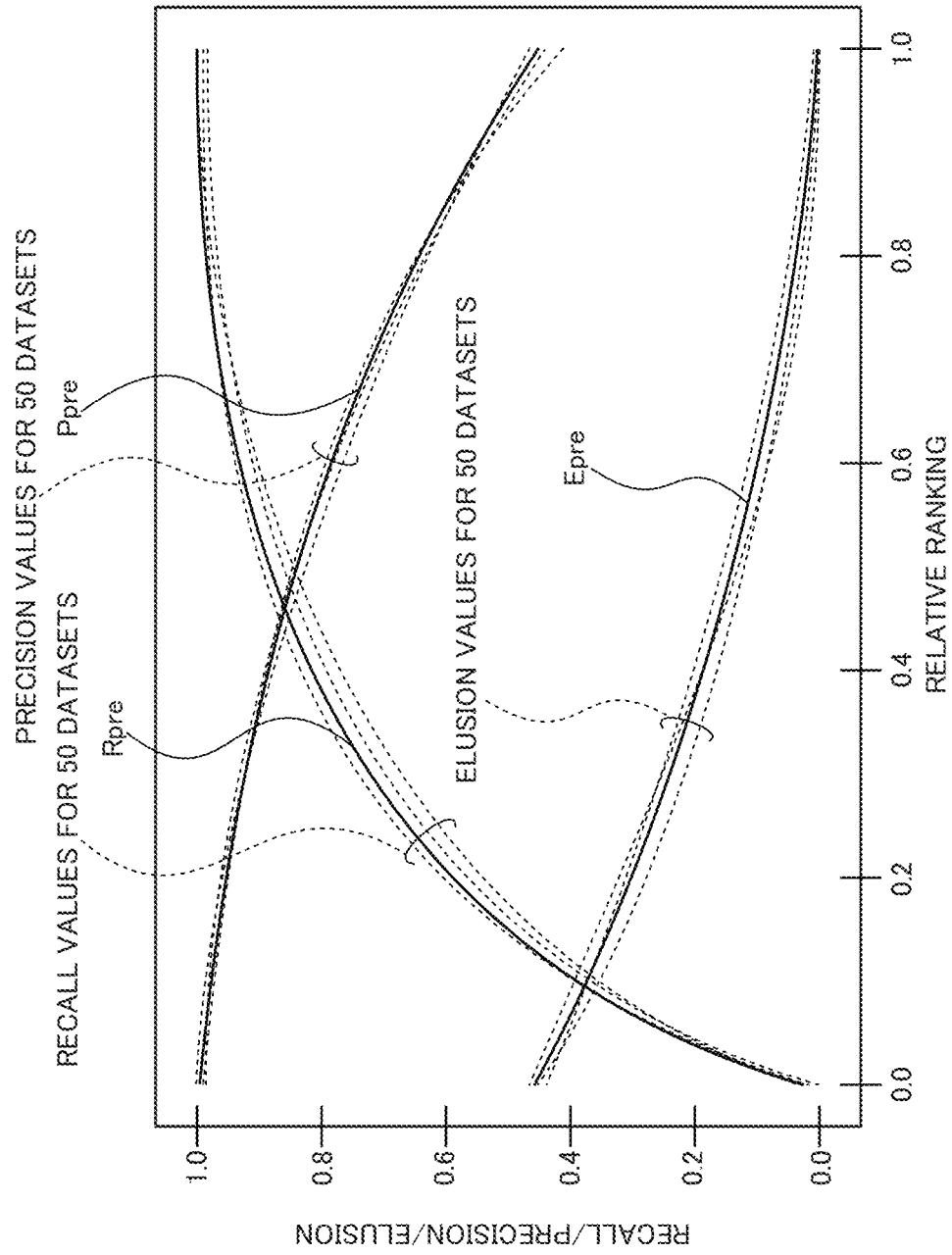
FIG. 5H is a conceptual drawing illustrating the second evaluation data in accordance with the first embodiment.

The performance prediction series thus obtained is displayed in graphical form such as that in FIG. 5H on the display section 150, for example, along with the performance evaluation series. In FIG. 5H, each broken line represents a performance evaluation series, and each solid line represents a performance prediction series. In other words, 50 performance evaluation series and a single performance prediction series obtained on the basis of the average value of the top-ranked 10 of the 50 performance evaluation series are displayed for recall, precision, and elusion. This performance prediction series represents the performance predicted in the document search model 139.

Next, a description is given of steps S14 and S15. First of all, in step S14, the probability of the 120 labeled documents 133a being labeled "1" is calculated in each of the first learning models 135-1 to 135-50 (50 random forest models). FIG. 6A shows an example of these results. The document ID in FIG. 6A is the ID number (e.g., "1" to "120") assigned to each of the 120 labeled documents. As shown in FIG. 6A, by using the learning models 135-1 to 135-50, the probability of document ID1 being labeled "1" is calculated, and subsequently the probabilities of documents ID2 to ID120 being labeled "1" are calculated. The input data for the first learning models 135-1 to 135-50 may be a main document component of the labeled documents 133a. How to calculate the main document component will be described in detail in the second embodiment.

Next, a description is given of step S15 with reference to FIG. 6B. Referring to FIG. 6B, in step S15, the neural network NN learns using the probabilities obtained in FIG. 6A as an input. In the neural network NN, the input layer includes, for example, 50 units, or as many units as the first learning models 135. The neural network NN includes no intermediate layer. The output layer includes, for example, two units, or as many units as the label count ("0" and "1"). Each unit in the output layer is, as an example, a Softmax function. Then, for each document ID, 50 probabilities are inputted to the 50 units in the input layer. For instance, first of all, for document ID1, the probability P1 (=0.7) obtained in the first learning model 135-1 is inputted, the probability P50 (=0.5) obtained in the first learning model 135-50 is inputted, and so are the probabilities P2 to P49. The probabilities P1 to P50 are given respective weights w11, w12, w13, . . . w150 before being inputted to one of the units in the output layer and respective weights w21, w22, w23, . . . w250 before being inputted to the other unit in the output layer. The output layer then outputs the probability P100 for label "1" and the probability P200 for label "0." This process is performed on each document ID1 to 120 so as to optimize weights w11, w12, w13, . . . w150 and w21, w22, w23, . . . w250, which completes the generation of the neural network NN for the document search model 139.

Next, a description is given of steps S16 and S17. In steps S16 and S17, unknown documents are searched using the document search model 139 obtained in step S15. In other words, similarly to step S14, the probability of the 1,000 unlabeled documents 133b being labeled "1" is calculated in each of the first learning models 135-1 to 135-50 (50 random forest models). As a result, similarly to FIG. 6A, by using the learning models 135-1 to 135-50, the probability of document ID121 being labeled "1" is calculated, and subsequently the probability of each document ID121 to ID1120 being labeled "1" is calculated.

Figure 7A:
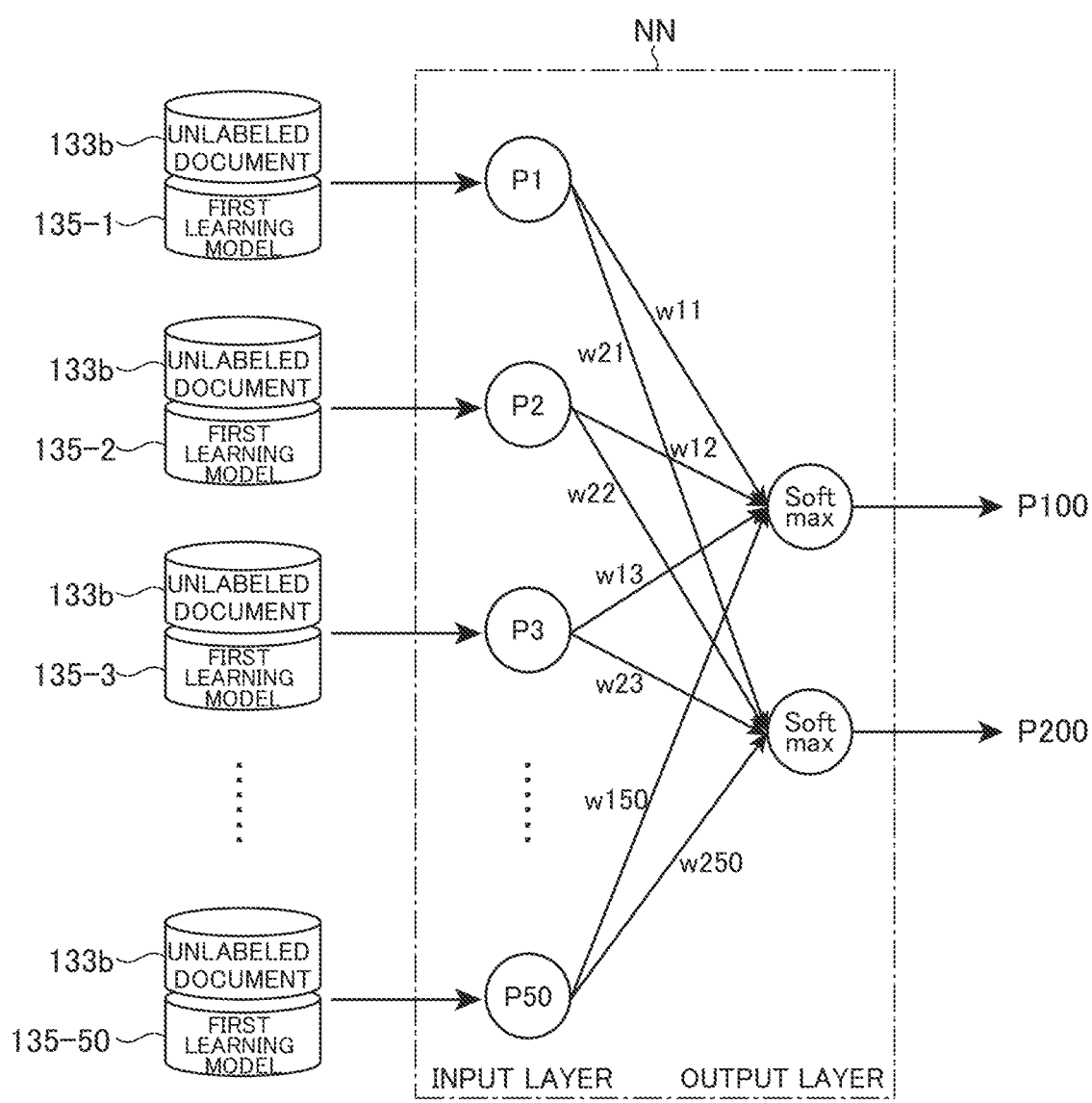
FIG. 7A is a conceptual drawing illustrating a neural network in accordance with the first embodiment.

Next, a description is given of step S17 with reference to FIG. 7A. Referring to FIG. 7A, in step S17, the probabilities obtained in step S16 are fed to the neural network NN that has learned in step S15. As a result, as shown in FIG. 7B, a final probability for label "1" is obtained for each of the unlabeled documents 133b. The unknown documents are ranked in descending order of the probability. These results are displayed, for example, on the display section 150. The importance of each document can be evaluated on the basis of the performance prediction series in the results obtained in step S17 as shown in FIG. 7C.

Referring to FIG. 7C, the recall Rpre for the relative ranking of 0.025 in the performance prediction series is 0.0290. Accordingly, it is expected that the recalls for the unlabeled documents 133b with the same relative ranking are equal. It is also expected that when the preliminary reviewing indicates that relevant documents account for 50% (60 out of 120 documents), 50% of the unlabeled documents 133b (500 out of 1,000 documents) are relevant documents. Accordingly, as shown in FIG. 7C, the document with a relative ranking of 0.025 in the unlabeled documents 133b is ranked $25^{th}$ by absolute ranking. In other words, it is expected that when the $1^{st}$ to $25^{th}$ documents by absolute ranking are reviewed, these 25 documents contain 14.5 (=2.9%) of the 500 relevant documents. The same mechanism works for precision and elusion. The mechanism enables the reviewer to collect, from relative ranking, information as to how many reviewed documents will produce how large or small a recall, precision, or elusion.

Effects of Present Embodiment

The information processing device in accordance with the present embodiment enhances the reliability of machine learning models as described above. A description is given next of this effect.

Cross validation is one of conventional techniques of predicting performance of a learning model. In cross validation, sets of labeled data are used only after being categorized into training and validation purposes. Models learn using training data. The performance of the learning model on the validation data is regarded as the performance predicted when the learning model is applied to unknown data. The learning model that is inferred to have the best performance on unknown data is used in categorization of the unknown data.

The models selected through cross validation, however, have only learned a part of labeled data (training data). If there are a small number of sets of labeled data, precision on unknown data could decrease due to the insufficient learning data. Especially, in e-discovery business, it is often required to predict the labels of hundreds of thousands of documents based on approximately 1,000 to 2,000 labeled documents, and it can be difficult to improve precision. Additionally, each lawsuit has unique circumstances, which makes it difficult to repurpose the labeled data used in another lawsuit. All these conditions make it difficult to improve the predictability and precision of the model.

In contrast, the present embodiment prepares a plurality of models (random forest models in the present embodiment) with different settings and a plurality of datasets including training documents and validation documents. Each model learns and is validated using datasets associated to the model. In other words, each model is subjected to cross validation. In addition, a neural network learns using results obtained from the plurality of models as an input. When unknown data is categorized, the plurality of models validates the unknown data and inputs results of the validation to the neural network to predict the labels of the documents. In other words, the present embodiment uses not only one of the models that exhibits the best performance, but all the models. In other words, the present embodiment employs ensemble learning. This particular structure enhances the precision of models. The structure also enhances precision in predicting the performance of the model because the performance is predicted based on cross validation by means of a plurality of models.

Second Embodiment

A description is given next of an information processing device, an information processing method, and a non-transitory computer-readable medium in accordance with a second embodiment of the present invention. The present embodiment relates to a method of generating the first evaluation data 134, the first learning model 135, and the dataset 137 in the information processing device 100 in the first embodiment. The following description will focus on differences from the first embodiment.

Configuration

Figure 8:
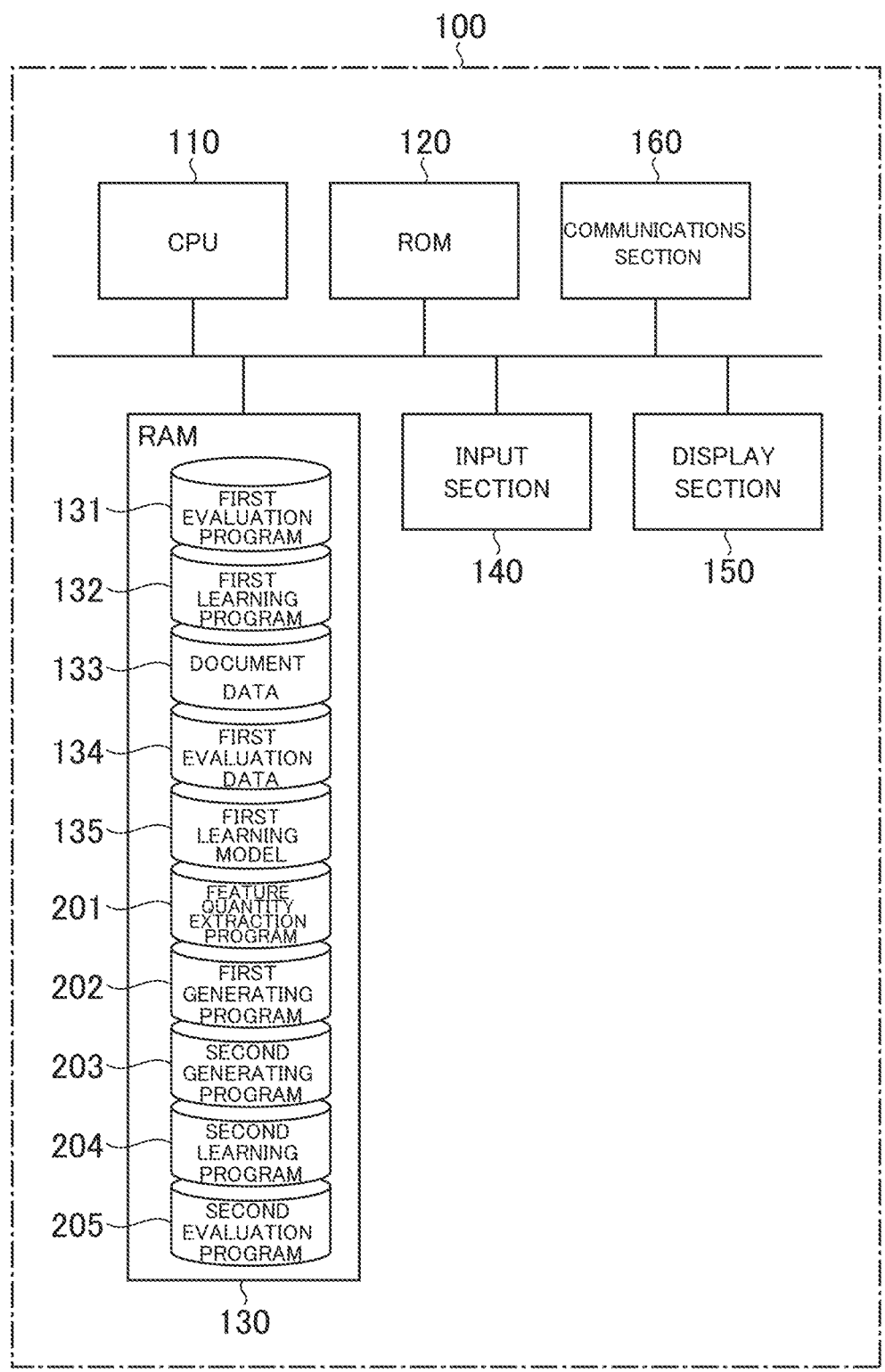
FIG. 8 is a block diagram of an example of an information processing device in accordance with a second embodiment.

FIG. 8 is a block diagram of the information processing device 100 in accordance with the present embodiment. Referring to FIG. 8, the information processing device 100 in accordance with the present embodiment differs from the configuration shown in FIG. 1 described in the first embodiment in that the RAM 130 further contains a feature quantity extraction program 201, a first generating program 202, a second generating program 203, a second learning program 204, and a second evaluation program 205. All or some of these programs 201 to 205 may be consolidated into a single program.

Figure 9:
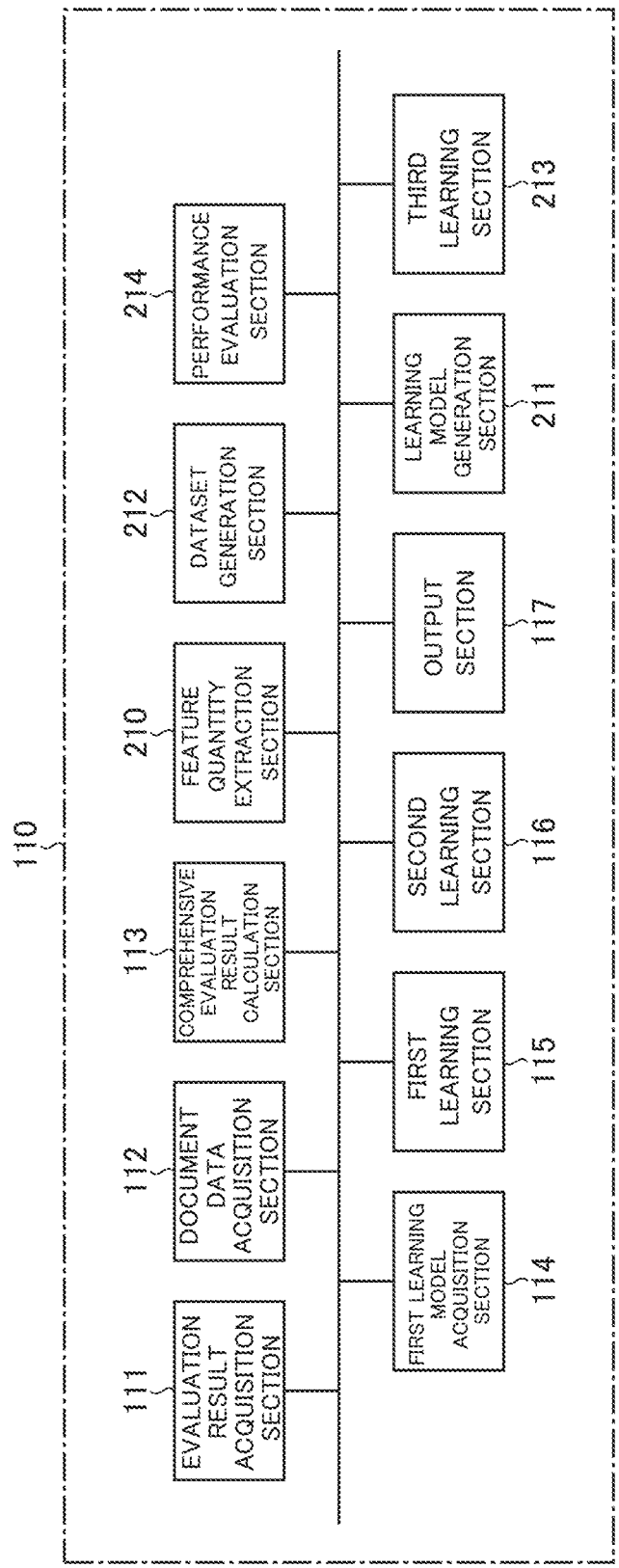
FIG. 9 is a functional block diagram of a processor in accordance with the second embodiment.

FIG. 9 is a functional block diagram of the processor 110 in executing the programs 201 to 205. Referring to FIG. 9, the processor 110 serves as a feature quantity extraction section 210, a learning model generation section 211, a dataset generation section 212, a third learning section 213, and a performance evaluation section 214 in FIG. 3 described in the first embodiment.

The feature quantity extraction section 210 is realized by the processor 110 executing the feature quantity extraction program 201. The feature quantity extraction section 210 extracts a feature quantity from a set of target documents to generate a matrix of main document components.

The learning model generation section 211 is realized by the processor 110 executing the first generating program 202. The learning model generation section 211 generates a learning model for cross validation. As described in the first embodiment, random forest models are generated in the present embodiment.

The dataset generation section 212 is realized by the processor 110 executing the second generating program 203. The dataset generation section 212 generates the datasets 137 on the basis of labeled documents.

The third learning section 213 is realized by the processor 110 executing the second learning program 204. The third learning section 213 trains the random forest models generated by the learning model generation section 211, to generate the learned random forest models 135.

The performance evaluation section 214 is realized by the processor 110 executing the second evaluation program 205. The performance evaluation section 214 is generated by the learning model generation section 211 to evaluate the performance of the random forest models 135 learned by the third learning section.

Operation

Figure 10:
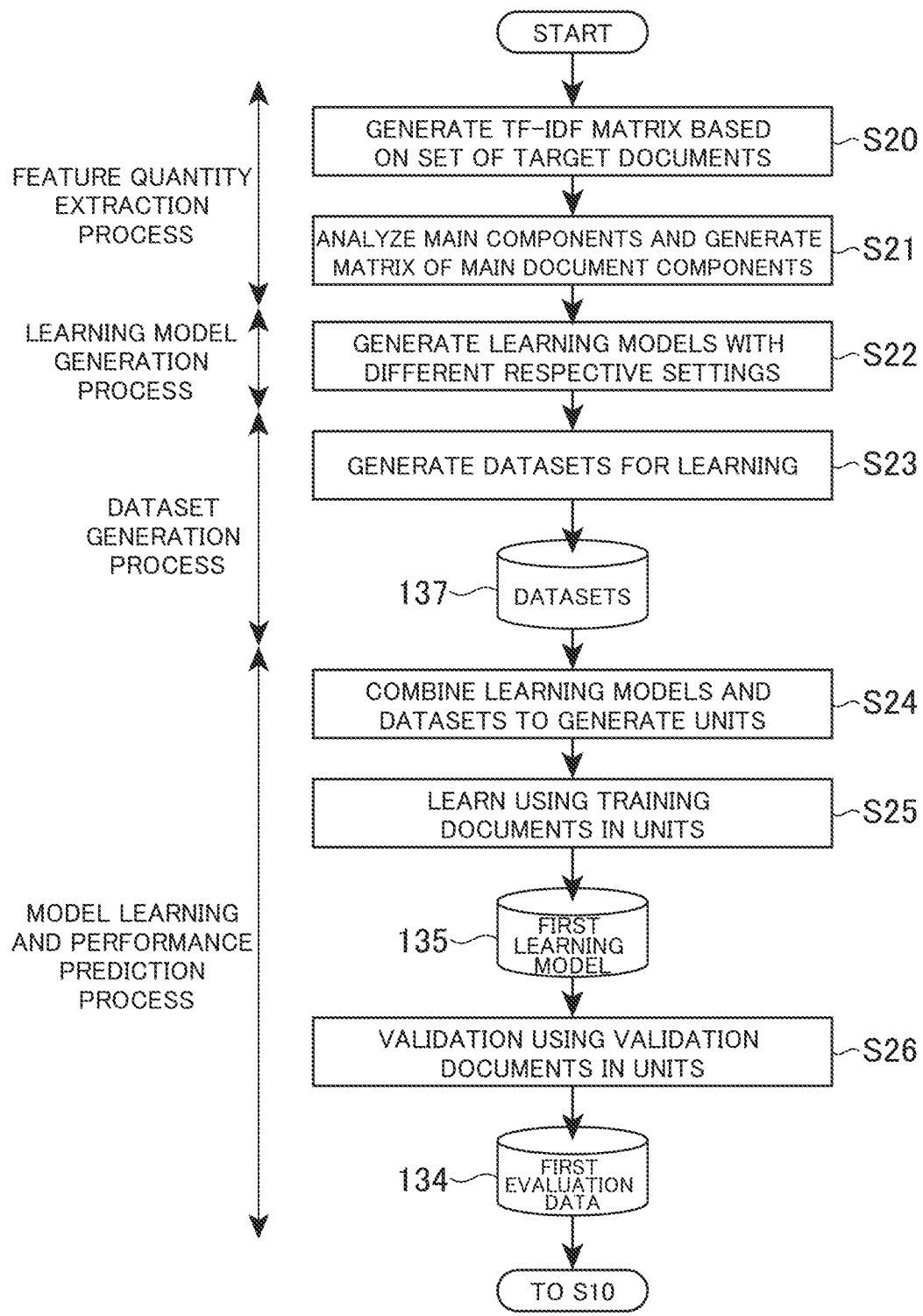
FIG. 10 is a flow chart representing an information processing method in accordance with the second embodiment.

A description is now given of the operation of the information processing device 100 in accordance with the present embodiment with reference to FIG. 10. FIG. 10 is a flow chart representing the flow of a process performed by the information processing device 100. Referring to FIG. 10, the process broadly includes a feature quantity extraction process, a learning model generation process, a dataset generation process, and a model learning and performance prediction process.

First, the processor 110 in the information processing device 100 executes the feature quantity extraction program 201 to perform the feature quantity extraction process. In other words, the feature quantity extraction section 210 in the processor 110 generates a TF-IDF matrix on the basis of a set of target documents (step S20). The set of target documents may be, for example, the labeled documents 133a described in the first embodiment with reference to FIG. 5A and may contain the unlabeled documents 133b in addition to the labeled documents 133a. The feature quantity extraction section 210 continues the process by analyzing the main components of the generated TF-IDF matrix to generate a matrix of main document components (step S21).

Next, the processor 110 executes the first generating program 202 to perform the learning model generation process. In other words, the learning model generation section 211 generates learning models with different respective settings (step S22). As described in the first embodiment, 50 random forest models are generated in the present example.

Next, the processor 110 executes the second generating program 203 to perform the dataset generation process. In other words, the dataset generation section 212 generates, for example, the 50 datasets 137 described in the first embodiment with reference to FIG. 5B on the basis of the labeled documents 133a (step S23).

Next, the processor 110 executes the second learning program 204 and the second evaluation program 205 to perform the model learning and performance prediction process. In other words, the third learning section 213 first combines the 50 learning models generated in in step S22 and the 50 datasets 137 generated in step S23 to generate 50 units (step S24). The third learning section 213 continues the process by learning each learning model using training documents in an associated one of the datasets in all the 50 units (step S25). This step generates 50 learned random forest models, that is, the first learning models 135 described in the first embodiment. The performance evaluation section 214 validates each first learning model 135 using validation documents in an associated one of the datasets in all the 50 units. The performance of the 50 first learning models 135 is then predicted on the basis of results of the validation (step S26). In other words, the recall, precision, and elusion are obtained for the 50 first learning models 135. This is the first evaluation data 134, which is the performance evaluation series described in the first embodiment with reference to FIGS. 5C and 5D.

After obtaining the first learning model 135 and the first evaluation data 134 as described above, step S10 and subsequent steps described in the first embodiment are performed.

The operation described above is further described by way of specific examples. First, a description is given of the feature quantity extraction process in steps S20 to S22. This process is performed by, for example, LSI (latent semantic indexing). First, a TF (term frequency) matrix is calculated. FIG. 11A is a conceptual drawing illustrating a TF matrix. Referring to FIG. 11A, the TF matrix represents the number of occurrences of words T1 to TM in each document (M is a natural number greater than or equal to 2). For instance, in the example of FIG. 11A, word T1 appears 3 times, word T2 appears zero times, and word T3 appears once in document ID3. Words T1 to TM used in the TF matrix are related to an event (lawsuit in the present example). The TF matrix may be calculated for both the labeled documents 133a and the unlabeled documents 133b because it is not clear which of the documents is to be used by the model in learning (i.e., whether or not the documents are labeled) when the calculation of the TF matrix, which can be performed independently from preliminary reviewing, is completed. If it is clear, the TF matrix may be calculated for the 120 labeled documents. In the process of FIG. 7A described in the first embodiment, the TF matrix may be calculated for all the 1,120 documents in step S20 because the main components of the 1,000 unlabeled documents 133b are fed to the random forest models.

Next, the DF (document frequency) is calculated. FIG. 11B is a conceptual drawing illustrating the DF. The DF indicates the number of documents in which a word appears at least once. In the example of FIG. 11B, word T1 appears at least once in 15 documents, and word T2 appears at least once in four documents.

Next, a TF-IDF matrix is calculated. FIG. 11C is a conceptual drawing illustrating a TF-IDF matrix. The TF-IDF matrix represents the importance of a word in a document. The IDF (inverse document frequency) represents the rarity of a word. Rare words will likely be useful in determining the characteristics of a document. The TF-IDF matrix has a greater value for a higher occurrence frequency and a higher rarity. In the example of FIG. 11C, word T1 in document ID3 has a value of 0.3. This value represents the importance of word T1 in document ID3 and is calculated from the TF and DF values of document ID3. In the example of FIG. 11C, the values in the matrix are subjected to L2 normalization to fall in the range of [0,1]. The TF-IDF matrix, normalized to such a range, can be readily used in machine learning and data analysis.

Next, a matrix of main components is calculated. FIG. 11D is a conceptual drawing illustrating a matrix of main components. Main component analysis consolidates numerous correlated variables (words in the present example) to "main component" variables to reduce the dimension of data. Referring to FIG. 11D, words T1 to TM are replaced by main components C1 to CK (K is a natural number greater than or equal to 2; for example, K<M, and K=100 as an example). If, for example, the main component C1 has a large value in a document, it indicates that the group of words linked to the main component C1 has a relatively high level of importance across the entire document. FIG. 11E represents how strongly the main components C1 to CK are correlated to words T1 to TM. In FIG. 11E, a higher value indicates a higher level of importance of a word in the main component. For instance, FIG. 11E shows that the main component C2 is strongly correlated to Word™. The document data fed to the random forest models in, for example, steps S14 and S16 in the first embodiment is the main components C1 to CK shown in FIG. 11D.

Figure 12:
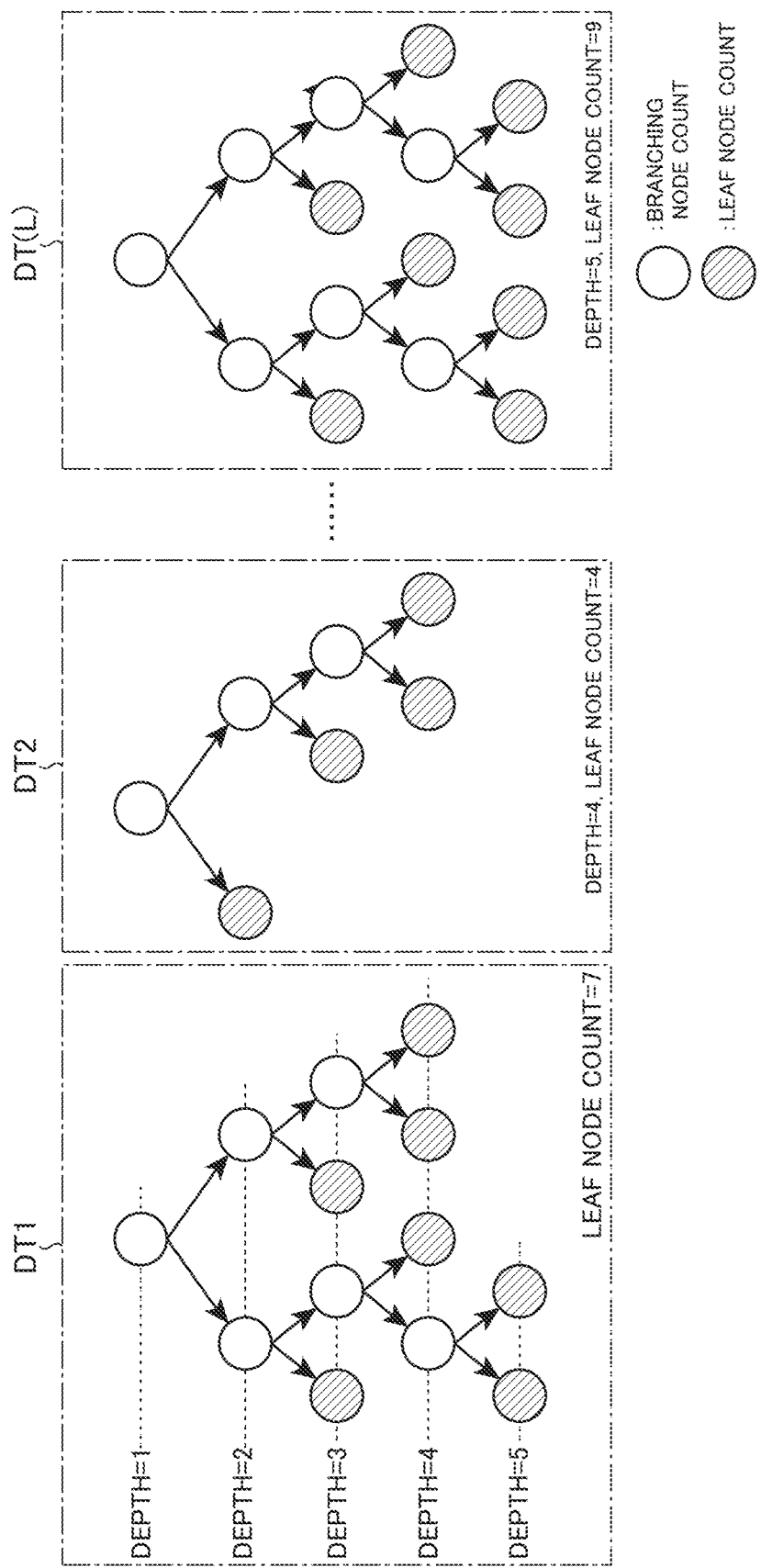
FIG. 12 is a conceptual drawing illustrating a random forest model in accordance with the second embodiment.

A description is given next of the learning model generation process. The learning model generation section 211 generates learning models with different settings in step S22. In the present example, for example, 50 random forest models are generated. FIG. 12 is a conceptual drawing illustrating a single random forest model.

Referring to FIG. 12, the random forest model contains L decision trees DT (L is a natural number greater than or equal to 2) (DT1 to DT(L)). In the decision tree DT, white circles represent branching nodes, and hatched circles represent leaf nodes. Each branching node has data categorization rules in accordance with the values of main components: for example, "if a given document has a main component C17 that is less than or equal to −1.385, proceed to the lower left branch." In constructing the decision trees DT, there may be a limit on a minimum number of branches: for example, "if a fewer training documents 133b than a predetermined number have been categorized so far, do not proceed to next branching." "Depth" in FIG. 12 denotes the depth (or height) of the node and is equivalent to how many branching have been followed. In the present example, the decision tree DT1 has a depth of 5, the decision tree DT2 has a depth of 4, and the decision tree DT(L) has a depth of 5. Putting a limit on a maximum depth restrains the random forest model from being excessively biased by the training document 133b (in other words, from losing generalization capability).

A leaf node located at the far end of branching corresponds to a final output for given data (main components). Each training document 133b is allocated to a leaf node. Then, each leaf node predicts the label of an unknown document based on the ratio as to whether or not the allocated document is relevant to the event. For instance, when a decision tree is applied to an unknown document, and a leaf node is reached to which 9 training documents with label "1" and a single training document with label "0" are allocated, it is determined that the unknown document is a relevant document with a 90% probability. Putting a limit on the number of leaf nodes, similarly to the depth, restrains the random forest model from being excessively biased by the training document.

A random forest model includes a plurality of decision trees for a given training document. The random forest model has the following main settings.

Number of decision trees
Minimum number of documents needed for branching
Maximum number of leaf nodes
Maximum depth As an example, 50 random forest models are generated in the present embodiment, and each random forest model has, for example, the following main settings.

Number of decision trees: 20 (for all the random forest models)
Minimum number of sets of data needed for branching: 2 to 8, periodically specified for 50 random forest models RF1 to RF50
Maximum number of leaf nodes: 8 to 204, periodically specified for the 50 random forest models RF1 to RF50
Maximum number of leaf nodes: 3 to 23, periodically specified for the random forest models RF1 to RF50.

The 50 random forest models RF1 to RF50 are generated in this manner.

Figure 13A:
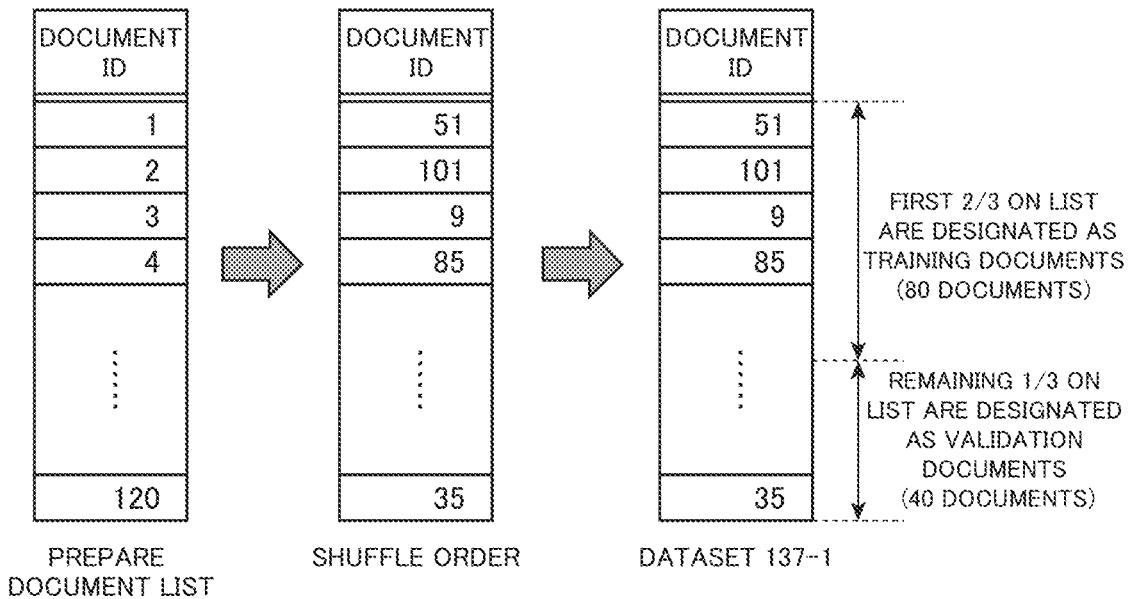
FIG. 13A is a conceptual drawing illustrating a method of generating a dataset in accordance with the second embodiment.
Figure 13B:
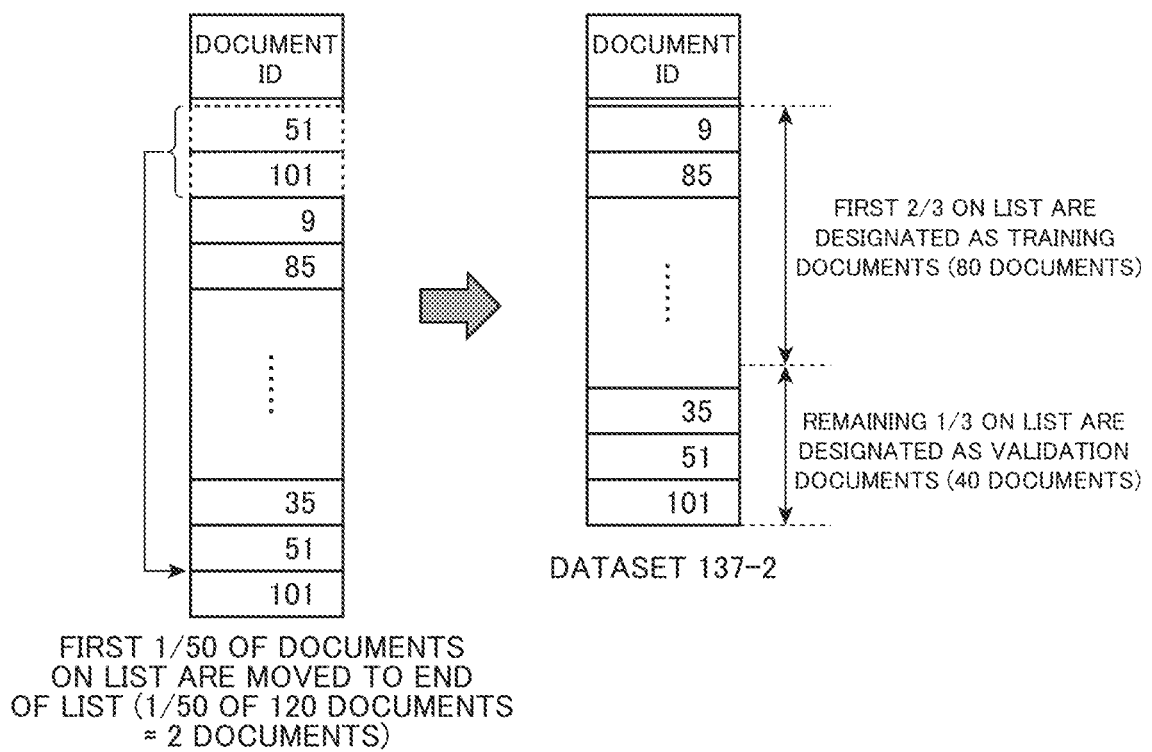
FIG. 13B is a conceptual drawing illustrating a method of generating a dataset in accordance with the second embodiment.

A description is given next of the dataset generation process in step S23 with reference to FIGS. 13A and 13B. FIGS. 13A and 13B schematically illustrate a method of generating the datasets 137-1 and 137-2.

First, as shown in FIG. 13A, the dataset generation section 212 prepares a document ID list of 120 labeled documents 133a as targets. The dataset generation section 212 continues the process by shuffling (randomizing the order of) the documents. The dataset generation section 212 then designates a first portion of a document list of the shuffled documents (e.g., the first two-thirds of the document list (=80 documents)) as training documents and a second portion thereof (e.g., the remaining one-third of the document list (=40 documents)) as validation documents, to generate the dataset 137-1.

As shown in FIG. 13B, the dataset generation section 212 continues the process by moving the first 1/50 of the documents (2 documents in the present example) on the document list for the dataset 137-1 to the end of the list. Documents ID51 and ID101 are moved to the end of the list in the present example. Similarly to a dataset 137-1, the dataset generation section 212 then designates a third portion of the document list (e.g., the first two-thirds) as training documents and a fourth portion (e.g., the remaining one-third) as validation documents, to generate the dataset 137-2. A process similar to that in FIG. 13B is repeated to generate the 50 datasets 137-1 to 137-50. As a result, the datasets 137-1 to 137-50 all contain the same set of documents, but different sets of training documents and different sets of validation documents. Cross validation is enabled by this preparation of these different sets of training documents and validation documents.

Figure 14A:
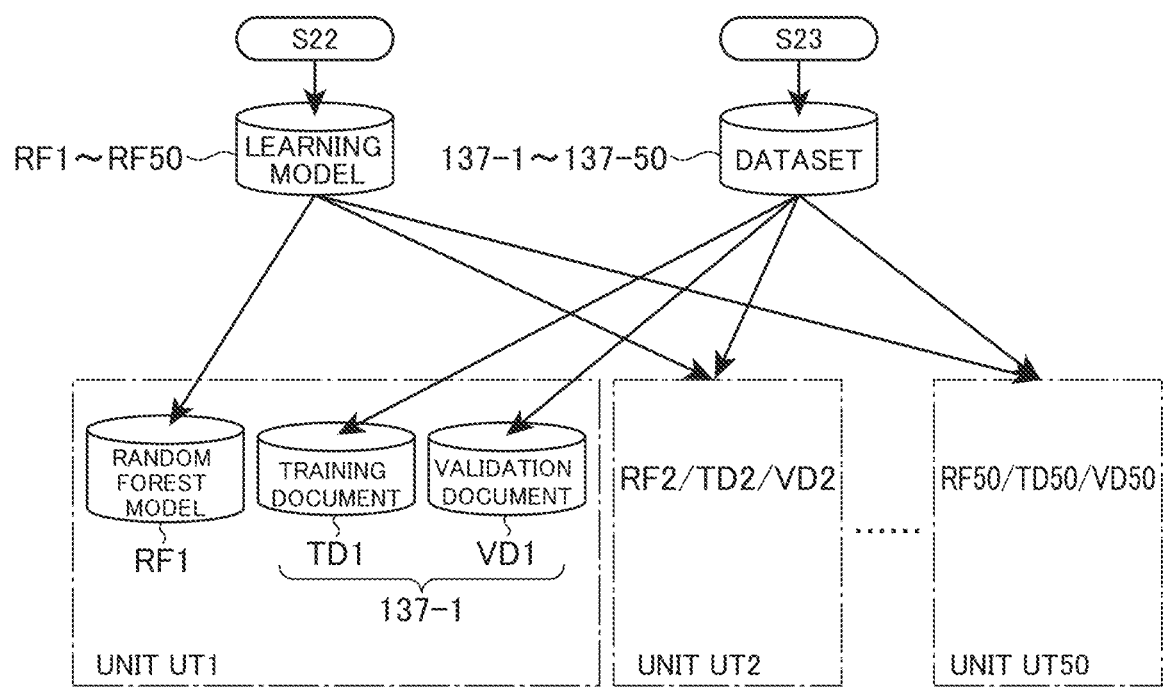
FIG. 14A is a conceptual drawing illustrating a method of generating a unit in accordance with the second embodiment.

A description is given next of the model learning and performance prediction process in steps S24 to S26. The third learning section 213 first associates the 50 random forest models RF to the 50 datasets 137 to prepare 50 units UT1 to UT50, which is illustrated in FIG. 14A. Referring to FIG. 14A, the unit UT1 contains the random forest model RF1 and the dataset 137-1. The unit UT2 contains the random forest model RF2 and the dataset 137-2. A similar description applies to the rest of the units; the unit UT50 contains the random forest model RF50 and the dataset 137-50.

Figure 14B:
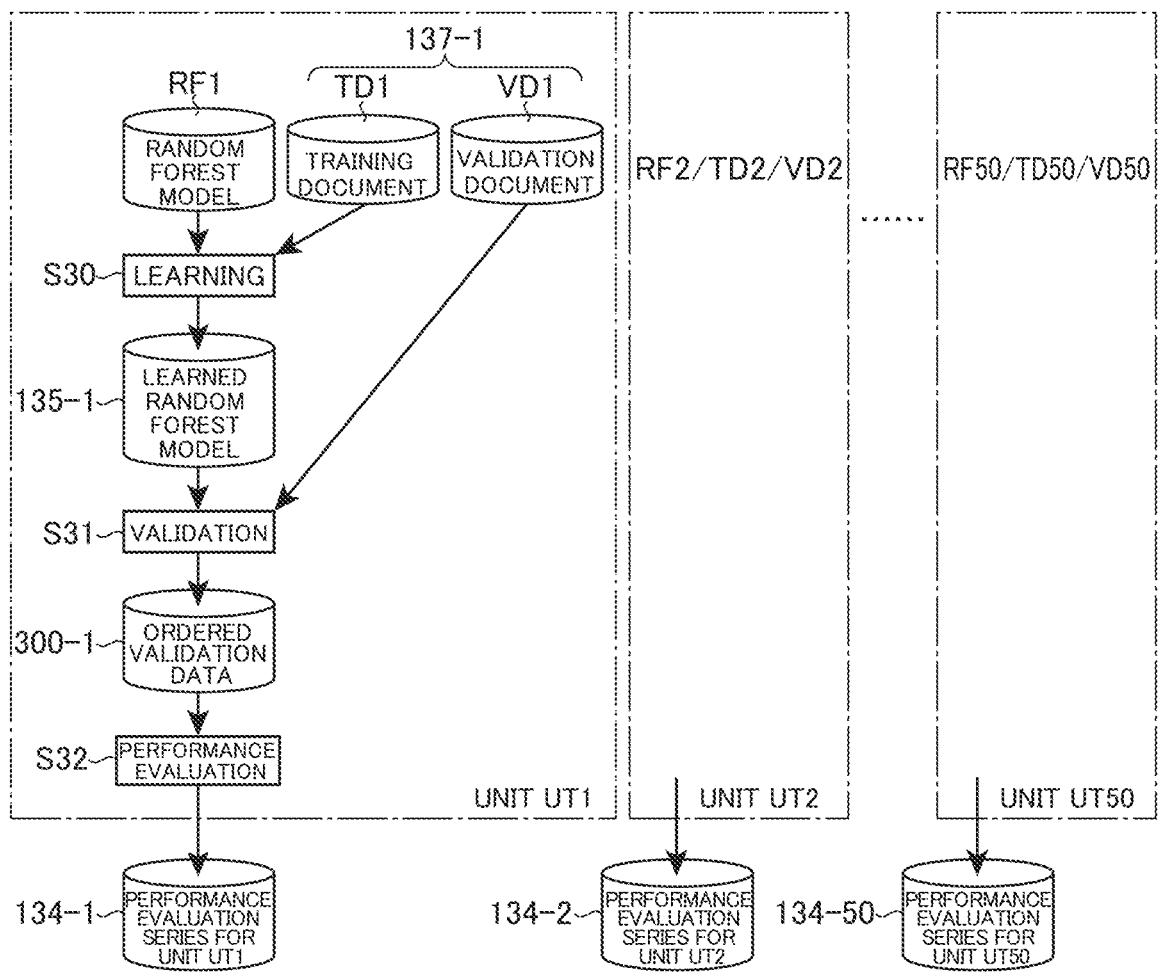
FIG. 14B is a conceptual drawing illustrating a method of evaluating a unit in accordance with the second embodiment.

The third learning section 213 continues the process by learning and validating the random forest models RF. The performance evaluation section 214 evaluates the performance of each random forest model RF on the basis of the results of the validation to generate a performance evaluation series, which is illustrated in FIG. 14B. Referring to FIG. 14B, the third learning section 213 causes the random forest model RF1 to learn using a training document TD1 in the dataset 137-1 in the unit UT1 (step S30). The input data to the random forest model RF1 here is the main document components C1 to CK of the training document TD1 (see FIG. 11D), and the output data is a result of the prediction of label information (e.g., the probability of the document being labeled "1"). Each decision tree in the random forest model RF1 produces a prediction output. These prediction outputs are consolidated in the random forest model RF1 to output a prediction result. A similar process is performed subsequently on the units UT2 to UT50.

A learned random forest model is generated as a result of step S30. This corresponds to the first learning model 135 described in the first embodiment. The third learning section 213 continues the process by validating the random forest model RF1 using a validation document VD1 in the dataset 137-1 in the unit UT1 (step S31). The input data to the random forest model RF1 here is again the main document components C1 to CK of the validation document VD1, and the output data is a result of the prediction of label information (e.g., the probability of the document being labeled "1"). A similar process is performed subsequently on the units UT2 to UT50.

As a result of step S31, sets of ordered validation data 300-1 to 300-50 are obtained from the respective units UT1 to UT50. The sets of validation data 300-1 to 300-50 are the document IDs being arranged in descending order of the probability of the documents being labeled "1" about the validation document VD1 and may be represented by FIG. 7B described in the first embodiment if "PROBABILITY OF BEING RELEVANT AS OUTPUTTED BY NN" is replaced with "PROBABILITY OF BEING RELEVANT AS OUTPUTTED BY RANDOM FOREST MODEL." Thereafter, the performance evaluation section 214 evaluates the performance of the units UT1 to UT50 on the basis of the sets of validation data 300-1 to 300-50 (step S32). More specifically, the performance evaluation section 214 calculates the recall, precision, and elusion described in the first embodiment to obtain performance evaluation series 134-1 to 134-50 for the units UT1 to UT50. These performance evaluation series 134-1 to 134-50 are an equivalent of the first evaluation data 134 described with reference to FIG. 5C in the first embodiment.

Effects of Present Embodiment

Figure 15:
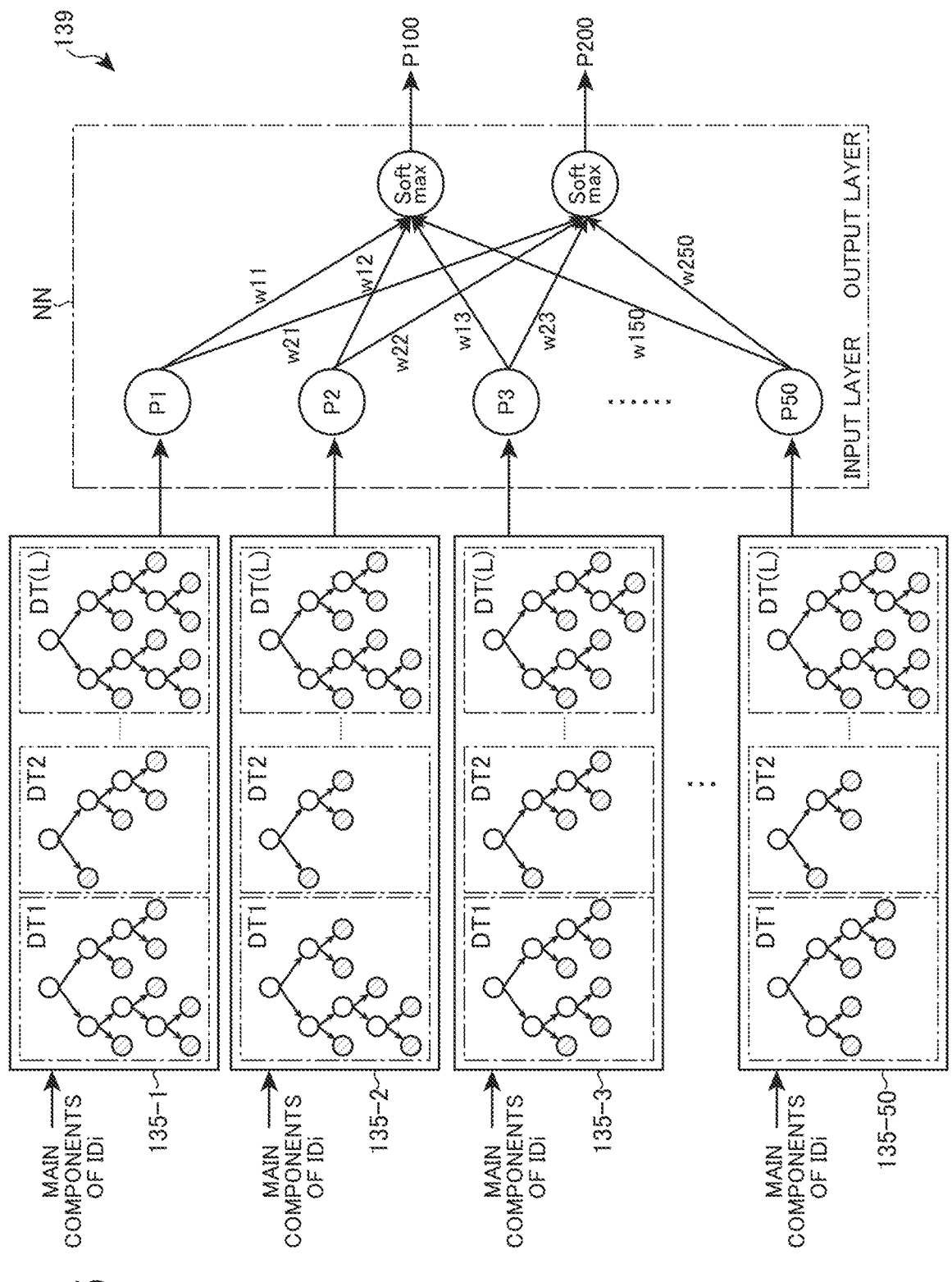
FIG. 15 is a conceptual drawing illustrating a document search model in accordance with the second embodiment.

FIG. 15 is a conceptual drawing illustrating the document search model 139 obtained in the present embodiment. Random forest models may be used as the first learning model 135 in the present embodiment. The precision and performance predictability for the document search model 139 can be improved by using results from a plurality of random forest models with different settings such as depths and leaf node counts. Furthermore, the main document components obtained using LSI are used as input data to the random forest models. This particular configuration reduces the dimension of input data, hence the amount of calculation to be handled by the processor 110.

A plurality of datasets (e.g., the 50 datasets 137-1 to 137-50) is generated on the basis of a common set of data (e.g., the 120 labeled documents 133a). Each dataset 137 contains learning data (training documents) and validation data (validation documents). Each dataset 137 contains a different set of documents as learning data and a different set of documents as validation data. This particular configuration enables the generation of different datasets with even when, for example, the labeled documents 133a are few. In addition, applying a plurality of datasets to different random forest models enables improving of the precision and general applicability of the document search model 139.

Variation Examples and General Remarks

As described above, the embodiment relates to an information processing method involving: obtaining a first evaluation result (e.g., a performance evaluation series for the unit UT1) representing performance of a first machine learning model (e.g., random forest model 135-1) having learned using first learning data (e.g., training document TD1 in the dataset 137-1), the first evaluation result being calculated using first validation data (e.g., the validation document VD1 in the dataset 137-1) differing from the first learning data; obtaining a second evaluation result (performance evaluation series for the unit UT2) representing performance of a second machine learning model (e.g., the random forest model 135-2) having learned using second learning data (e.g., the training document TD2 in the dataset 137-2) differing from the first learning data, the second machine learning model differing from the first machine learning model, the second evaluation result being calculated using second validation data (e.g., the validation document VD2 in the dataset 137-2) differing from the first validation data; and calculating, based on the first evaluation result and the second evaluation result, a comprehensive evaluation result (performance prediction series for the document search model 139) representing performance of a single machine learning model including the first machine learning model and the second machine learning model (random forest models 135+model-connecting NN=document search model 139), the performance of the single machine learning model being predicted when the single machine learning model is applied to unevaluated, unknown data relevant to a prescribed event (e.g., lawsuit), wherein the first learning data, the second learning data, the first validation data, and the second validation data are evaluated data (labeled data) relevant to the prescribed event.

These embodiments are mere examples, and many variations are possible. For instance, the embodiments assume, as an example, that the document search model 139 is a combination of a random forest model and a neural network. The invention is not limited to these learning models. Various machine learning models such as a support vector machine or naive Bayes may be used instead of the neural network.

The embodiments also assume, as an example, that the various processes shown in FIGS. 4 and 10 are performed by the processor 110 using software (the programs 131, 132, and 201 to 205) and assume, as an example, that the programs 131, 132, and 201 to 205 are contained in the RAM 130. The programs 131, 132, and 201 to 205 are however not necessarily contained in the RAM 130. Alternatively, the programs 131, 132, and 201 to 205 may be contained in a computer-readable (i.e., readable by the processor 110) storage device (storage medium), and this storage medium may be a "non-transitory tangible medium" such as a tape, a disc/disk, a card, a semiconductor memory, or a programmable logic circuit. The programs may be fed to a computer via any transmission medium capable of transmission.

The processes shown in FIGS. 4 and 10 may be at least partially implemented by hardware or a combination of hardware and software. Additionally, the steps in the flow chart described in the embodiments may be reordered where possible.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An information processing method that extract documents relevant to an event from numerous documents and rank the extracted documents in accordance with relevance thereof, the method comprising:
   extracting feature quantity of a set of target documents to generate a feature matrix;
   generating a plurality of machine learning models including a first and a second machine learning models, each of said machine learning models respectively has a setting different from each other with respect to depths and leaf node counts;
   generating a set of datasets;
   combining the plurality of machine learning models with the set of datasets to form a plurality of units, each of said units respectively associate one of the machine learning models to one of the datasets in order to perform learning of the one of the machine learning models by using the associated one of the datasets; and predicting performance of each one of the plurality of machine learning models based on validation result in each of said units, comprising:

obtaining a first evaluation result representing performance of the first machine learning model having learned using first learning data, the first evaluation result being calculated using first validation data differing from the first learning data, wherein a first dataset includes the first learning data and the first validation data;

obtaining a second evaluation result representing performance of the second machine learning model having learned using second learning data differing from the first learning data, wherein a second dataset includes the second learning data and the second validation data, the second machine learning model differing from the first machine learning model, the second evaluation result being calculated using second validation data differing from the first validation data; and calculating, based on the first evaluation result and the second evaluation result, a comprehensive evaluation result including:

representation of performance of the first machine learning model predicted when the first machine learning model is applied to unevaluated, unknown data relevant to a prescribed event, and representation of performance of the second machine learning model predicted when the second machine learning model is applied to the unknown data, wherein the first learning data, the second learning data, the first validation data, and the second validation data are evaluated data relevant to the prescribed event.

2. The information processing method according to claim 1, wherein the first machine learning model and the second machine learning model use one of:
a random forest model,
a shallow-layer neural network,
a support vector machine,
logistic regression, and
a landscaping.

3. The information processing method according to claim 2, wherein
both the first machine learning model and the second machine learning model are a random forest model including a decision tree,
the decision tree of the first machine learning model and the decision tree of the second machine learning model have different depths and/or leaf node counts.

4. The information processing method according to claim 1, further comprising:
obtaining a third evaluation result representing performance of a third machine learning model that is included in the plurality of machine learning models and that has learned using third learning data differing from the first learning data and the second learning data, the third machine learning model differing from the first machine learning model and the second machine learning model, the third evaluation result being calculated using third validation data differing from the first validation data and the second validation data, wherein
the comprehensive evaluation result is calculated based not on the third evaluation result, and
the comprehensive evaluation result further includes representation of performance of the third machine learning model predicted when the third machine learning model is applied to the unknown data.

5. The information processing method according to claim 1, wherein
the comprehensive evaluation result is calculated based on high-ranked evaluation results among a plurality of evaluation results without using low-ranked evaluation results among the plurality of evaluation results,
each of the plurality of evaluation results represents performance of a plurality of machine learning models having learned using different respective sets of learning data, the performance being calculated using different respective sets of validation data,
the sets of learning data include the first learning data and the second learning data,
the sets of validation data include the first validation data and the second validation data,
the plurality of machine learning models includes the first machine learning model and the second machine learning model, and
the plurality of evaluation results includes the first evaluation result and the second evaluation result.

6. The information processing method according to claim 1, wherein
the first evaluation result includes a recall for the first machine learning model,
the second evaluation result includes a recall for the second machine learning model, and
the comprehensive evaluation result is obtained based on the recalls.

7. The information processing method according to claim 6, wherein
the first validation data includes first documents,
the second validation data includes second documents, and
the first documents and the second documents are given respective rankings in accordance with relevance thereof to the prescribed event,
the method further comprising displaying the rankings, recalls of the first documents associated with the rankings in the first machine learning model, and recalls of the second documents associated with the rankings in the second machine learning model.

8. The information processing method according to claim 7, further comprising displaying the comprehensive evaluation result in each of the rankings based on an average of recalls of a plurality of machine learning models that is ranked high in a validation result obtained using the evaluated data.

9. The information processing method according to claim 1, wherein
the first learning data is a first portion of a first dataset, and the first validation data is a second portion, of the first dataset, that does not include the first portion,
the second learning data is a third portion of the first dataset, and the second validation data is a fourth portion, of the first dataset, that does not include the third portion,
the first portion at least partially differs from the third portion, and
the second portion at least partially differs from the fourth portion.

10. The information processing method according to claim 9, wherein
the first learning data includes a portion that is included in the second learning data, and the first validation data includes a portion that is included in the second validation data.

11. The information processing method according to claim 9, wherein
the first learning data includes a portion that is included in the second validation data, and
the first validation data includes a portion that is included in the second learning data.

12. The information processing method according to claim 1, wherein a number of the plurality of machine learning models is at least 50.

13. The information processing method according to claim 12, wherein each of the learning models is a different random forest model.

14. The information processing method according to claim 1, wherein learning data is a labeled document that is reviewed to evaluate as to whether the document has relevance with the prescribed event.

15. The information processing method according to claim 14, wherein the prescribed event is selected from a group consisting of lawsuit, information leak, violation of law and regulation compliance, harassment, divorce and accident.

16. The information processing method according to claim 14 further comprising:
calculating, in each of the plurality of machine learning models, probability that the labeled document has relevance with the prescribed event; and
performing learning on neural network by using the probability as input.

17. An information processing device comprising: a processor and non-transitory computer-readable medium containing an information processing program executed by the processor, configured to: extract feature quantity of a set of target documents to generate feature matrix, generate a plurality of machine learning models including a first and a second machine learning models, each of said machine learning models respectively has a setting different from each other with respect to depths and leaf node counts, generate a set of datasets, combine the plurality of machine learning models with the set of datasets to form a plurality of units, each of said units respectively associate one of the machine learning models to one of the datasets in order to perform learning of the one of the machine learning models by using the associated one of the datasets, obtain a first evaluation result representing performance of a first machine learning model having learned using first learning data, the first evaluation result being calculated using first validation data differing from the first learning data and to obtain a second evaluation result representing performance of a second machine learning model having learned using second learning data differing from the first learning data, the second machine learning model differing from the first machine learning model, the second evaluation result being calculated using second validation data differing from the first validation data, to thereby predict performance of each one of the plurality of machine learning models based on validation result in each of said units, and calculate, based on the first evaluation result and the second evaluation result, a comprehensive evaluation result including: representation of performance of the first machine learning model predicted when the first machine learning model is applied to unevaluated, unknown data relevant to a prescribed event, and representation of performance of the second machine learning model, predicted when the second machine learning model is applied to the unknown data, wherein the first learning data, the second learning data, the first validation data, and the second validation data are evaluated data relevant to the prescribed event.

18. A non-transitory computer-readable medium containing an information processing program executed by a processor, the information processing program thereby causing the processor to:
extract feature quantity of a set of target documents to generate feature matrix;
generate a plurality of machine learning models including a first and a second machine learning models, each of said machine learning models respectively has a setting different from each other with respect to depths and leaf node counts;
generate a set of datasets;
combine the plurality of machine learning models with the set of datasets to form a plurality of units, each of said units respectively associate one of the machine learning models to one of the datasets in order to perform learning of the one of the machine learning models by using the associated one of the datasets; and
execute an evaluation program to predict performance of each one of the plurality of machine learning models based on validation result in each of said units, comprising:
obtain a first evaluation result representing performance of a first machine learning model having learned using first learning data, the first evaluation result being calculated using first validation data differing from the first learning data;
obtain a second evaluation result representing performance of a second machine learning model having learned using second learning data differing from the first learning data, the second machine learning model differing from the first machine learning model, the second evaluation result being calculated using second validation data differing from the first validation data; and
calculate, based on the first evaluation result and the second evaluation result, a comprehensive evaluation result including:
representation of performance of the first machine learning model predicted when the first machine learning model is applied to unevaluated, unknown data relevant to a prescribed event, and
representation of performance of the second machine learning model predicted when the second machine learning model is applied to the unknown data, wherein
the first learning data, the second learning data, the first validation data, and the second validation data are evaluated data relevant to the prescribed event.

* * * * *